United States Patent
Tanaka et al.

(10) Patent No.: US 9,064,202 B2
(45) Date of Patent: Jun. 23, 2015

(54) DATA PROCESSING APPARATUS AND PRINT DATA GENERATING METHOD

(71) Applicant: CANON KABUSHIKI KAISHA, Tokyo (JP)

(72) Inventors: Wakako Tanaka, Inagi (JP); Hirokazu Tanaka, Inagi (JP); Tetsuya Edamura, Inagi (JP); Kiichiro Takahashi, Yokohama (JP); Yusuke Komano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/906,216

(22) Filed: May 30, 2013

(65) Prior Publication Data

US 2013/0329235 A1  Dec. 12, 2013

(30) Foreign Application Priority Data

Jun. 6, 2012 (JP) .................................. 2012-128892
Jul. 9, 2012 (JP) .................................. 2012-153576

(51) Int. Cl.
  *G06K 15/10* (2006.01)
  *G06K 15/02* (2006.01)
  *B41J 2/205* (2006.01)
  *H04N 1/40* (2006.01)

(52) U.S. Cl.
  CPC ........... *G06K 15/1848* (2013.01); *B41J 2/2056* (2013.01); *G06K 15/105* (2013.01); *H04N 1/40087* (2013.01)

(58) Field of Classification Search
  None
  See application file for complete search history.

(56) References Cited

U.S. PATENT DOCUMENTS

| | | | |
|---|---|---|---|
| 6,061,145 A | 5/2000 | Kanda | |
| 6,652,066 B2 | 11/2003 | Teshigawara | |
| 6,967,745 B1 | 11/2005 | Konno | |
| 6,991,316 B2 | 1/2006 | Maru | |
| 2005/0052669 A1* | 3/2005 | Takahashi | 358/1.9 |
| 2009/0322848 A1* | 12/2009 | Kadowaki | 347/224 |

FOREIGN PATENT DOCUMENTS

| | | |
|---|---|---|
| JP | 2004-90462 | 3/2004 |
| JP | 2007-306549 | 11/2007 |

* cited by examiner

*Primary Examiner* — Jeremiah Bryar
(74) *Attorney, Agent, or Firm* — Fitzpatrick, Cella, Harper & Scinto

(57) ABSTRACT

Textures in a printed image are reduced with a configuration that, provided that a matrix made up of a plurality of dot arrangement patterns is treated as a unit, binarizes image data is repeatedly applying such a matrix to the image data. Specifically, when a shift value K=k, a shift process calculates X+kY for the position (X, Y) of each cell in a 4×4 base matrix. The dot arrangement patterns are then shifted overall such that the cell where the value is k from among these values moves to the position (0, 0). The shift process is conducted while setting different shift values for every repeated use of the base matrix. As a result, regular textures are decreased in the case of using a base matrix made up of a gradation value Lv1 on a pixel area.

28 Claims, 22 Drawing Sheets

DATA PROCESSING APPARATUS AND PRINT DATA GENERATING METHOD

BACKGROUND OF THE INVENTION

1. Field of the Invention

The present invention relates to a data processing apparatus and a print data generating method, and more particularly, to technology that generates binary print data using dot arrangement patterns for the quantization of image data.

2. Description of the Related Art

This kind of dot arrangement pattern is a pattern that determines, for image data containing individual pixels at a horizontal and vertical resolution of 600 dpi for example, whether each of pixels in 1-pixel by 2-pixel ranges at 1200 dpi with double resolution in the vertical direction is a "printing (dot)" pixel or a "non-printing (no dot)" pixel, according to the gradation value of the image data. Then, with binary data generation, a dot arrangement pattern corresponding to the gradation values indicated by the image data may be used to convert the gradation values indicated by the 600 dpi image data into binary data (dot/no dot) in the 1-pixel by 2-pixel ranges. According to such binarization technology, data can be processed and transmitted at low resolution, thus preventing long data processing and transmission times, while in addition, the memory capacity in the printing apparatus can be reduced.

Japanese Patent Laid-Open No. 2004-90462 describes binary data generation technology using dot arrangement patterns as described above. Specifically, provided that the above 1-pixel by 2-pixel patterns are treated as single units, a 4-unit by 4-unit matrix is repeatedly applied to image data at a resolution of 600 dpi in the vertical and horizontal directions to generate binary data.

However, simply applying the technology disclosed in the above Japanese Patent Laid-Open No. 2004-90462 produces periodic patterns (textures) in the printed image, which correspond to the size of the 4-unit by 4-unit matrix that acts as the base unit. These textures may lower image quality. More specifically, by repeatedly applying patterns in which the 1-pixel by 2-pixel units constituting the 4-unit by 4-unit matrix having fixed relative positions, patterns of concentration and dispersion are produced in the layout of the 1-pixel by 2-pixel units over the entire printed image, and these patterns appear as periodic textures.

SUMMARY OF THE INVENTION

An object of the present invention is to provide a data processing apparatus and a print data generating method that are capable of reducing textures in a printed image in a configuration that, provided that a matrix made up of multiple dot arrangement patterns is treated as a unit, binarizes image data by repeatedly applying such a matrix to the image data.

In a first aspect of the present invention, there is provided a data processing apparatus comprising: an obtaining unit configured to obtain multi-valued data, a multi-value of which shows gradation of each of a plurality of pixels forming an image to be formed on a predetermined area of a print medium; a dot arrangement determining unit configured to determine a dot arrangement of the plurality of pixels corresponding to the predetermined area for each of predetermined areas, according to a unit matrix that arranges dot arrangement patterns corresponding to the plurality of pixels, the dot arrangement patterns being used to determine the dot arrangement and being based on multi-valued data corresponding to each of the plurality of pixels in the multi-valued data obtained by the obtaining unit; and a layout determining unit configured to determine a layout of the dot arrangement patterns in the unit matrix depending on the position of the predetermined area on the print medium, so that the layout of the dot arrangement patterns in the unit matrix used for a first predetermined area and the layout of the dot arrangement patterns in the unit matrix used for a second predetermined area the position of which differs from the position of the first predetermined area on the print medium.

In a second aspect of the present invention, there is provided a data processing method comprising the steps of: obtaining multi-valued data, a multi-value of which shows gradation of each of a plurality of pixels forming an image to be formed on a predetermined area of a print medium; determining a dot arrangement of the plurality of pixels corresponding to the predetermined area for each of predetermined areas, according to a unit matrix that arranges dot arrangement patterns corresponding to the plurality of pixels, the dot arrangement patterns being used to determine the dot arrangement and being based on multi-valued data corresponding to each of the plurality of pixels in the multi-valued data obtained by the obtaining unit; and determining a layout of the dot arrangement patterns in the unit matrix depending on the position of the predetermined area on the print medium, so that the layout of the dot arrangement patterns in the unit matrix used for a first predetermined area and the layout of the dot arrangement patterns in the unit matrix used for a second predetermined area the position of which differs from the position of the first predetermined area on the print medium.

According to the above configurations, it becomes possible to reduce textures in a printed image in a configuration that, provided that a matrix made up of multiple dot arrangement patterns is treated as a unit, binarizes image data by repeatedly applying such a matrix to the image data.

Further features of the present invention will become apparent from the following description of exemplary embodiments (with reference to the attached drawings).

BRIEF DESCRIPTION OF THE DRAWINGS

FIG. 2A is a block diagram illustrating an image processing system made up of the printing apparatus of the present embodiment illustrated in FIG. 1, while

FIG. 5A is a diagram illustrating a 4×4 base matrix formed by combining the two dot arrangement patterns corresponding to Lv1 illustrated in FIG. 4B in the main scan direction and the sub-scan direction, while

DESCRIPTION OF THE EMBODIMENTS

Hereinafter, embodiments of the present invention will be described in detail and with reference to the drawings.

Figure 1:
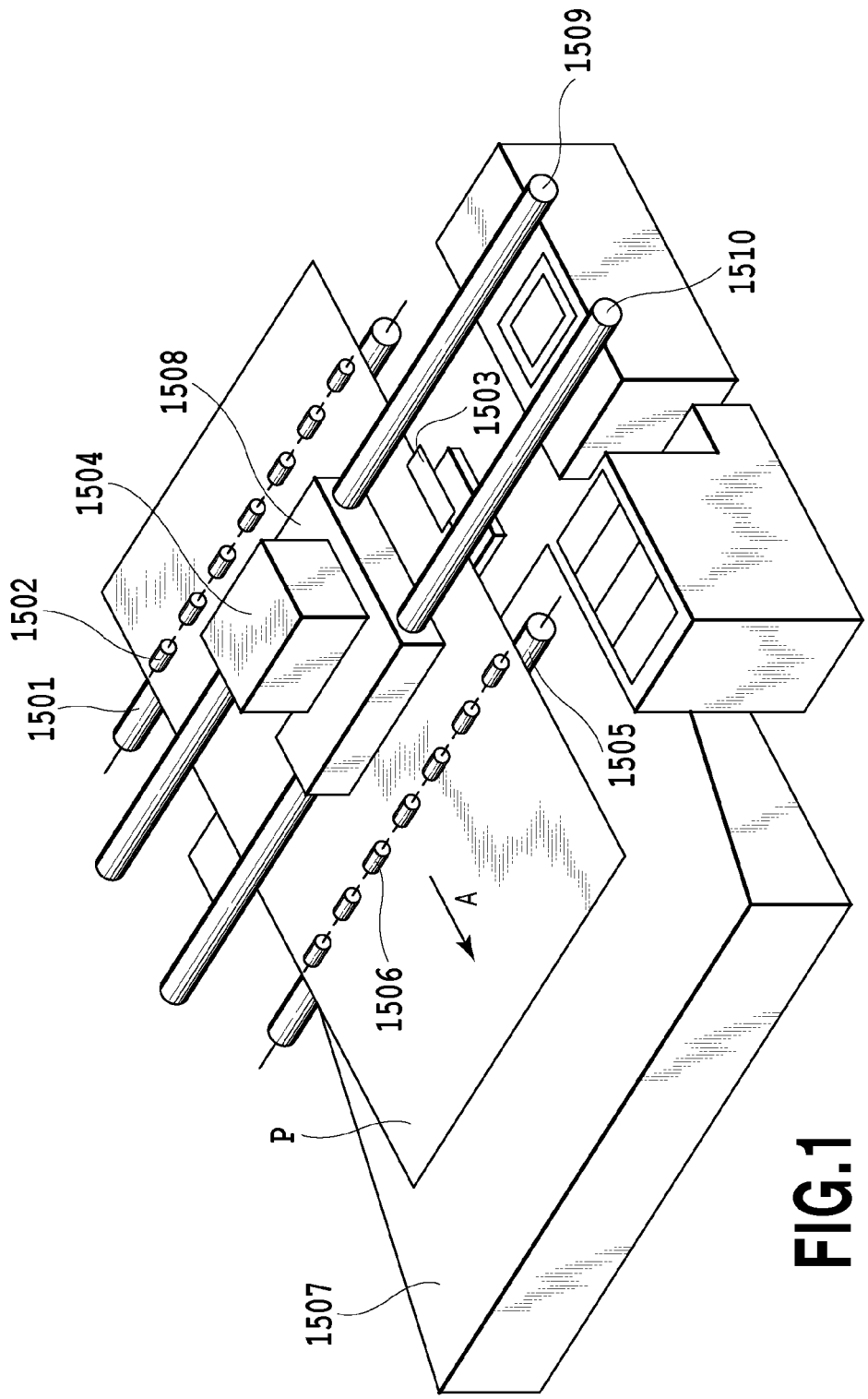
FIG. 1 is a perspective view illustrating a schematic configuration of an inkjet printing apparatus according to an embodiment of the present invention.

FIG. 1 is a perspective view illustrating a schematic configuration of an inkjet printing apparatus according to an embodiment of the present invention. A printing medium P such as a sheet of paper is held between a conveying roller 1501 and a driven pinch roller 1502 that elastically biases the print medium towards the conveying roller 1501. The print medium P is conveyed in the direction of the arrow A in FIG. 1 by the rotation of the conveying roller 1501 while being guided and supported by a platen 1503. The platen 1503 is provided in a printing area that faces a face of a print head (ejection face), which is mounted on a carriage 1508 and has ejection ports formed on the face for ejecting inks. The platen 1503, by supporting the back of the print medium P, maintains a constant given distance between the front of the print medium P and the face of the print head. After being conveyed onto the platen 1503 and printed upon, the print medium P is subsequently held between a discharge roller 1505 and driven rotary bodies, or spurs 1506, conveyed in direction A, and discharged into a discharge tray 1507.

A print head (not illustrated) and an ink tank 1504 that stores ink supplied to the print head are removably mounted onto the carriage 1508. The carriage 1508, by being driven by a driving mechanism such as a motor (not illustrated), is able to move back and forth along two guide rails 1509 and 1510. Due to the movement of the carriage, the print head scans over the print medium P, and is able to print by ejecting ink according to print data during these scans. The carriage movement direction crosses the print medium conveying direction (the direction of the arrow A), and is called the main scan direction or the horizontal direction. In contrast, the print medium conveying direction is called the sub-scan direction or the vertical direction. By alternately repeating the print head scans and the print medium conveyance as described above, printing is conducted over the entire the print medium P.

Figure 2A:
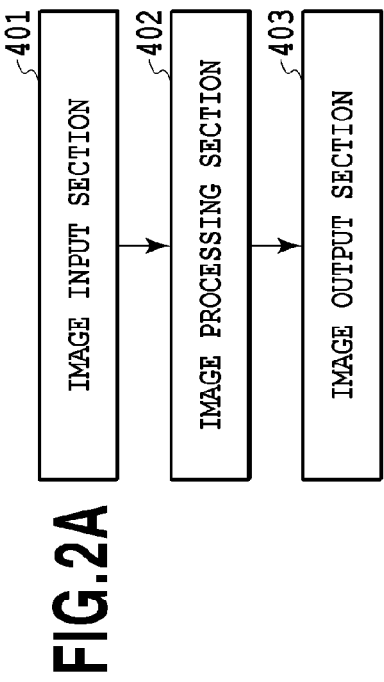

FIG. 2A is a block diagram illustrating an image processing system made up of the printing apparatus of the present embodiment illustrated in FIG. 1. In FIG. 2A, reference numeral 401 denotes an image input section that inputs multi-valued image data from an image input device such as a scanner or digital camera, and multi-valued image data stored in various kinds of storage media such as a hard disk. Reference numeral 402 denotes an image processing section that performs a known color conversion process and a later described binarization process for the multi-valued image data input by the image input section 401, and outputs binary print data. Also, reference numeral 403 denotes an image output section that conducts image printing on the basis of binary print data generated by the image processing section 402. The image output section includes the printing mechanism illustrated in FIG. 1.

The units illustrated in FIG. 2A, particularly the image input section 401 and the image processing section 402, are realized by a CPU that controls operations of respective components in a printing apparatus and processes data, ROM that stores a control program executed by the CPU, and RAM used as a work area for executing the control program, and the like. Note that the configuration of the binarization process using dot arrangement patterns discussed later with respect to the image processing section 402 is not necessarily required to be provided in a printing apparatus. For example, the image processing section 402 may also be realized in a host apparatus for the printing apparatus, such as a personal computer. An apparatus such as a printing apparatus or host apparatus that includes an image processing section and conducts the binarization process discussed later is herein designated an image processing apparatus.

Figure 2B:
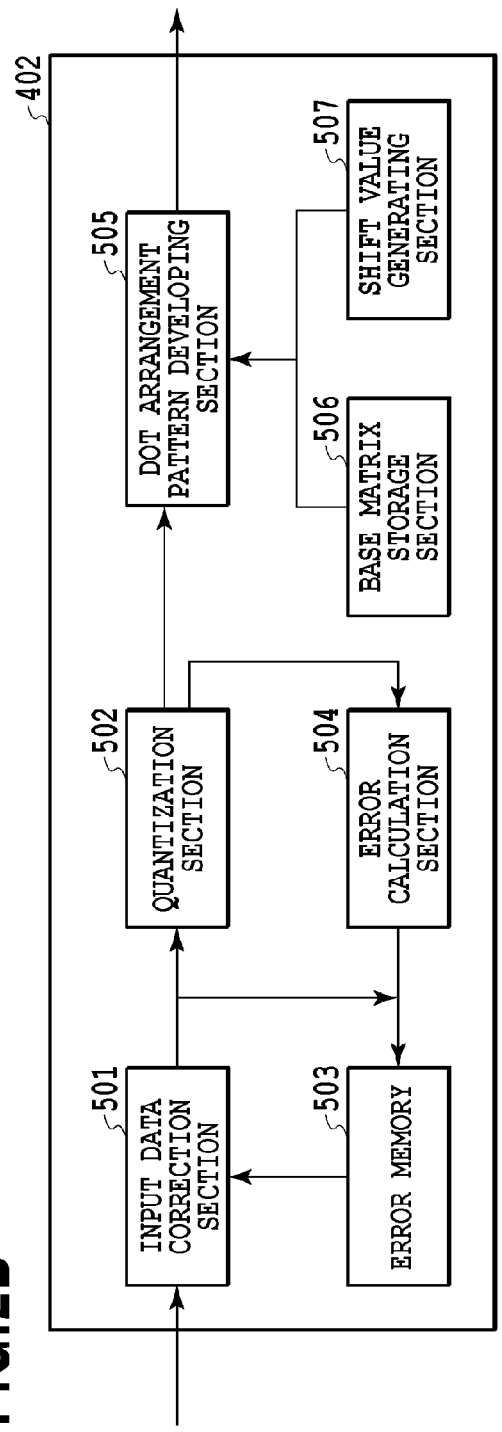
FIG. 2B is a block diagram illustrating a detailed configuration of the image processing section 402 illustrated in FIG. 2A.

FIG. 2B is a block diagram illustrating a detailed configuration of the image processing section 402 illustrated in FIG. 2A. An input data correction section 501 inputs multi-valued image data from the image input section 401, such as multi-valued image data expressed using 8 bits (256 gradations) per pixel, for example, and corrects the input image data by adding the error produced by quantization discussed later to the image data of pixels being processed. At this point, error expressed using 9 bits (−255 to 255) is added to the 0 to 255 values expressed by the input image data for one pixel (8 bits), and as a result, the image data for one pixel with added error is expressed using 10 bits, with the value becoming from −255 to 510. However, the input data correction section of the present embodiment limits the image data to a range from 0 to 255, and outputs image with 8 bits per pixel (bpp).

A quantization section 502 quantizes the multi-valued image data corrected by the input data correction section 501 into N-valued data, which is less than the 8-bit, 256-valued data. This N value is determined on the basis of factors such as the relationship between the input resolution and the output resolution. In the present embodiment, the input resolution is 600 dpi, while the output resolution is 600 dpi in the main scan direction and 1200 dpi in the sub-scan direction. In this case, there are two places in a 1-pixel (main scan direction) by 2-pixel (sub-scan direction) unit where a dot in the output image data ("printing") can be placed with respect to the 8 bpp input image data, and the number of gradations expressible by one such 1-pixel by 2-pixel unit becomes three values: 0 dots, 1 dot, and 2 dots. In other words, the quantization section 502 outputs 3-valued quantized data taking a value of "0", "128", or "255". Note that in this specification, the term "gradation value" is used to refer to a value expressing a gradation level. In other words, if the number of gradations is 3, the gradation values "N" are expressed as "Lv0", "Lv1", and "Lv2". In addition, respective quantized values are associated with gradation values, such that the quantized values "0", "128", and "255" are respectively associated with the gradation values "Lv0", "Lv1", and "Lv2", for example. Note that it may also configured such that gradation values corresponding to quantized values are output to a dot arrangement pattern developing section 505 discussed later. Note that for the sake of simplicity, the following will describe the gradation values as being output from the quantization section 502 to the dot arrangement pattern developing section 505.

An error calculation section 504 calculates the error between the quantized values quantized by the quantization section 502 and the multi-valued image data corrected by the input data correction section 501. Specifically, since the quantization section 502 quantizes the 8 bpp image data into three values, 8-bit data expressing the quantized values "0", "128", and "255" is input into the error calculation section 504. Meanwhile, 8 bpp (0 to 255) image data is input from the input data correction section 501. As a result, the values of the obtained error data become from −255 to 255, becoming data expressed using 9 bits. Error memory 503 distributes and stores the error obtained by the error calculation section 504 in this way in surrounding unprocessed pixels according to given ratios. Specifically, the error memory is made up of DRAM or the like.

As discussed later as an embodiment of the present invention, a dot arrangement pattern developing section 505 outputs dot data (binary data) according to "Lv0", "Lv1", and "Lv2" in the case where the quantized image data from the quantization section 502, or gradation value data, is 3-valued data as in the present embodiment. During this binarization process, the dot arrangement pattern developing section 505 repeatedly uses a base matrix of dot arrangement patterns stored in a base matrix storage section 506. Then, as discussed later, a shift value generating section 507 generates a shift value for determining a shift amount by which positions of a plurality of dot arrangement patterns constituting the base matrix are shifted, every time the base matrix is repeatedly used.

(First Embodiment)

A binarization process using dot arrangement patterns according to the first embodiment of the present invention in the printing apparatus described above will now be described.

Figure 3:
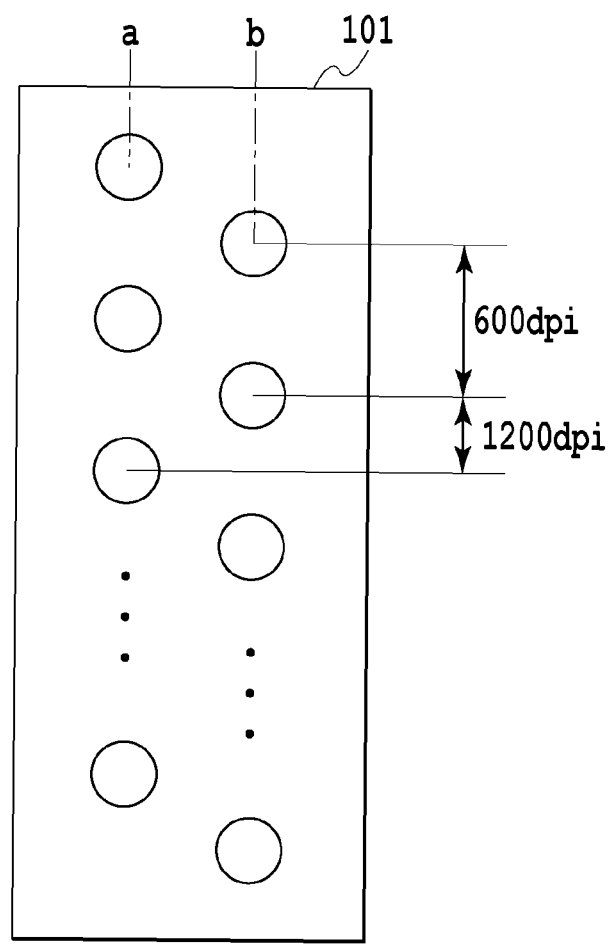
FIG. 3 is a diagram illustrating a nozzle array on a print head according to an embodiment of the present invention.

FIG. 3 is a diagram illustrating a nozzle array on a print head according to the present embodiment. FIG. 3 illustrates nozzle arrays that eject ink of one color. The nozzle arrays for one ink color are made up of a nozzle array "a" and a nozzle array "b". Ejection ports (nozzles) in the nozzle array a and the nozzle array b are respectively arrayed at a density of 600 dpi, and in addition, the nozzle array a and the nozzle array b are disposed shifted from each other by 1200 dpi in the sub-scan direction. Thus, the print head of the present embodiment is able to print at 1200 dpi resolution in the sub-scan direction.

Figure 4A:
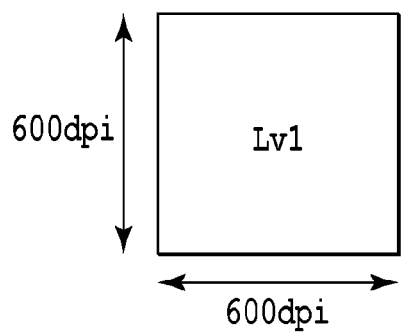
FIGS. 4A and 4B are diagrams illustrating dot arrangement patterns according to the present embodiment.
Figure 4B:

FIGS. 4A and 4B are diagrams illustrating dot arrangement patterns of the present embodiment, and illustrate dot arrangement patterns in the case of printing at a resolution of 600 dpi (main scan direction) by 1200 dpi (sub-scan direction) using the print head of the present embodiment illustrated in FIG. 3.

As illustrated in FIG. 4A, "Level 1" (Lv1) is obtained, for example, as image data quantized by the quantization section 502 at a resolution of 600 dpi (main scan direction) by 600 dpi (sub-scan direction). In contrast, as illustrated in FIG. 4B, there are two types of dot arrangement patterns available for use by the dot arrangement pattern developing section 505 in correspondence with the quantized data Lv1: a dot arrangement pattern that is printed using the nozzle array a (left side of FIG. 4B; hereinafter also referred to as the "upper pattern"), and a dot arrangement pattern that is printed using the nozzle array b (right side of FIG. 4B; hereinafter also referred to as the "lower pattern"). In other words, in the case where the quantized data for a given pixel is Lv1, the data for that pixel is binarized using one of the two types of dot arrangement patterns shown in FIG. 4B.

Figure 5A:
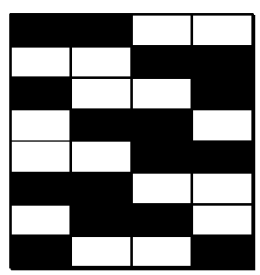

FIG. 5A is a diagram illustrating a 4×4 base matrix formed by combining the two dot arrangement patterns corresponding to Lv1 illustrated in FIG. 4B in the main scan direction and the sub-scan direction. In this base matrix, the first row of the 4×4 matrix contains the "upper pattern", the "upper pattern", the "lower pattern", and the "lower pattern", the second row contains the "upper pattern", the "lower pattern", the "lower pattern", and the "upper pattern", the third row contains the "lower pattern", the "lower pattern", the "upper pattern", and the "upper pattern", and the fourth row contains the "lower pattern", the "upper pattern", the "upper pattern", and the "lower pattern".

The dot arrangement pattern developing section 505, by repeatedly using this base matrix in the main scan direction and the sub-scan direction, converts the three-valued data quantized by the quantization section 502 into binary data (dot data) for image data in an area to be printed by scans of the print head. Note that the base matrix example illustrated in FIG. 5A illustrates the case where the image to be printed contains one continuous type of quantized data Lv1, also referred to as a solid image. More specifically, if the image to be printed is an image such as a natural image, for example, the 4×4 dot arrangement patterns constituting the base matrix will obviously not only be for one type of level. Since the present invention operates effectively on solid images and since the effects are readily noticeable, FIG. 5A and other drawings as well as the description thereof indicate examples in which the base matrix is made up of one type of dot arrangement patterns.

Figure 5B:
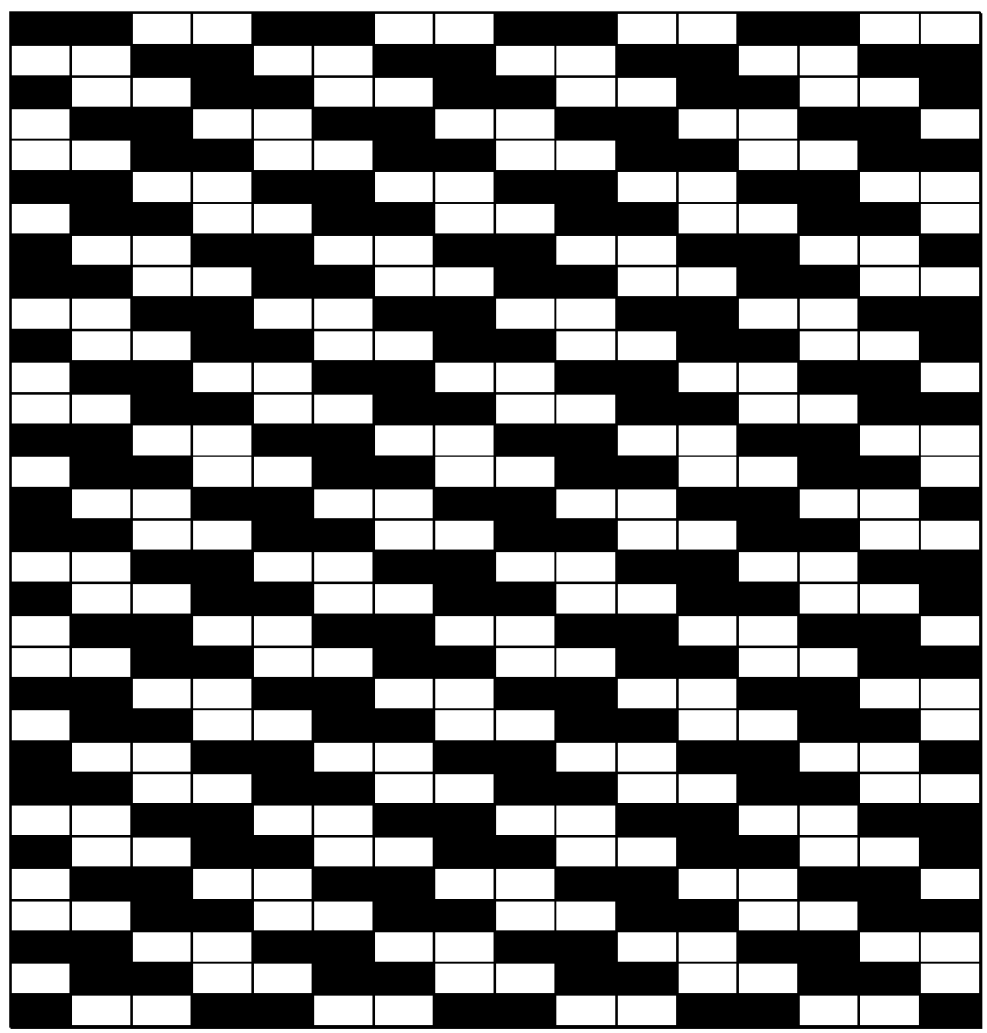
FIG. 5B is a diagram illustrating the result of repeatedly applying the base matrix illustrated in FIG. 5A as-is in the main scan direction and the sub-scan direction.

FIG. 5B is a diagram illustrating the result of repeatedly using the base matrix illustrated in FIG. 5A as-is in the main scan direction and the sub-scan direction. As illustrated in FIG. 5B, in the case of simply using the base matrix as-is, textures with the 4×4 matrix size (in the illustrated example, diagonal lines occurring from the upper-right to the lower-left) are produced as discussed earlier regarding Japanese Patent Laid-Open No. 2004-90462.

In contrast, in the present embodiment, the dot arrangement pattern developing section 505 changes the 4×4 layout of dot arrangement patterns in the base matrix according to a shift value generated by the shift value generating section 507. Specifically, as discussed later using FIG. 6 and subsequent drawings, a shift value is generated every time the base matrix is repeatedly used, and the layout of dot arrangement patterns in the base matrix are shifted by a shift amount corresponding to that shift value.

Figure 6:
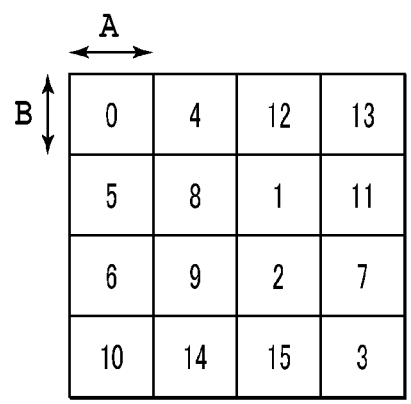
FIG. 6 is a diagram illustrating base matrix shift values K generated by the shift value generating section illustrated in FIG. 2B.

FIG. 6 is a diagram illustrating shift values K for the base matrix generated by the shift value generating section illustrated 507. As illustrated in FIG. 6, the shift value K of the present embodiment may be a value from 0 to 15. These values K are disposed in 4 (main scan direction) by 4 (sub-scan direction) cells, with the cells in which each value is disposed being determined by random numbers. Generalizing the above, the range of shift values K is an integer in the range 0≤K<(A×B), with A×B different values. In the present embodiment, A=B=4, and thus there are 16 different shift values.

The shift value generating section 507 generates the shift value "0" in the pixel area that first uses the base matrix. Then, when using the base matrix in the pixel area neighboring on the right side of that area in the main scan direction, the shift value generating section generates the shift value "4". Similarly, every time the area that uses the base matrix changes, the shift values "12" and "13" are successively generated. Then, when using the base matrix in an area neighboring the above pixel areas in the sub-scan direction, the shift value "5" is generated in the pixel area neighboring the pixel area where the shift value "0" was generated. Thereafter, the shift values "8", "1", and "11" are successively generated similarly in the main scan direction. Additionally, the shift values "6", "9", "2", and "7" are generated in the pixel areas neighboring in the sub-scan direction. Additionally, the shift values "10", "14", "15", and "3" are generated in the pixel areas neighboring in the sub-scan direction. Then, when completing the shift values generation of all of the 4×4 cells illustrated in FIG. 6 for pixel areas that use the base matrix, or in other words, when completing application of the base matrix 16 times, a similar process is repeated starting from the above shift value "0".

Figure 7A:
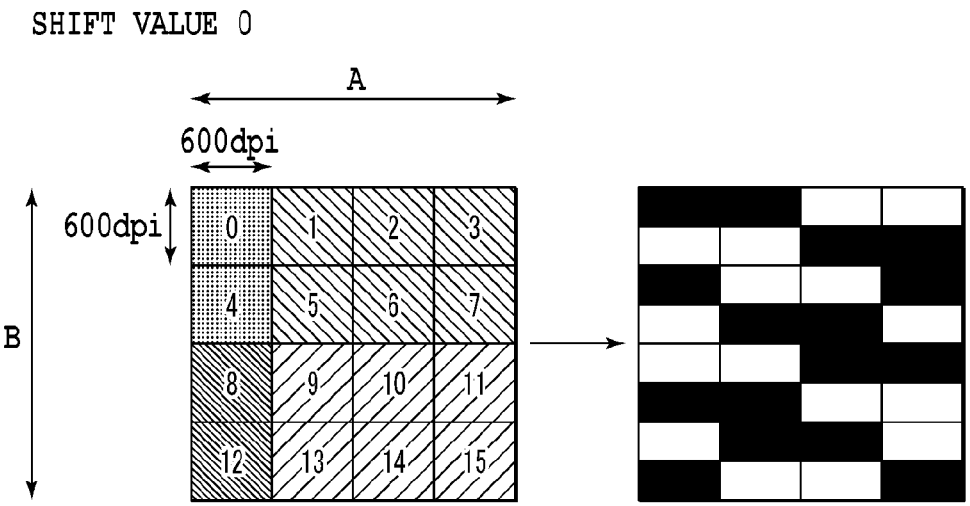
FIGS. 7A and 7B are diagrams illustrating a shift process for the case of K=0 and K=9 as examples from among the shift values K illustrated in FIG. 6.
Figure 7B:
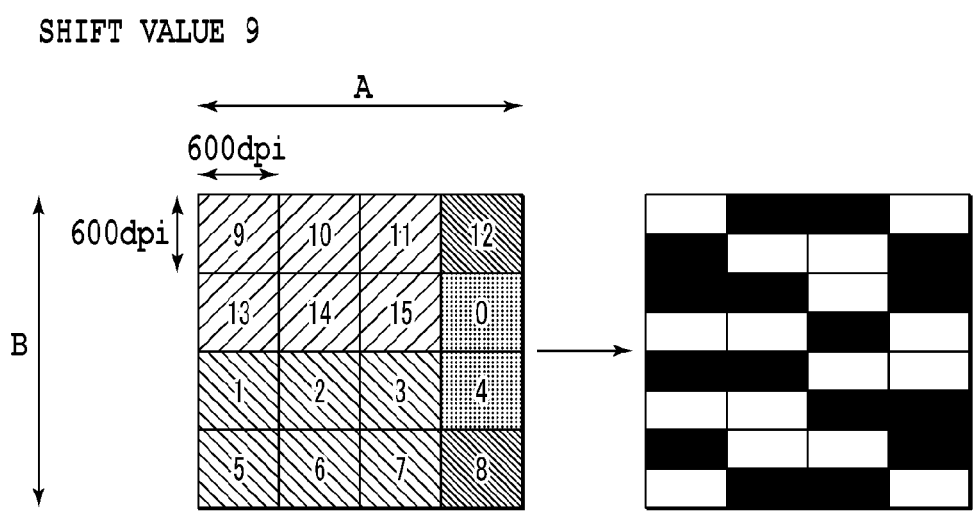

FIGS. 7A and 7B are diagrams illustrating a shift process for the case of K=0 and K=9 as examples from among the shift values K illustrated in FIG. 6. In the shift process of the present embodiment, first, take (X, Y) to be the position of each cell in the 4×4 base matrix, expressed as coordinates for a position X (0 to 3) in the main scan direction and a position Y (0 to 3) in the sub-scan direction. Herein, the position of a cell can be specified with an address given by the value of X+A×Y (where A is 4 in the present embodiment). For example, the position (0, 0) has the address 0 (=0+4×0), the position (1, 0) has the address 1 (=1+4×0), the position (0, 1) has the address 4 (=0+4×1), and so on to the position (3, 3) which has the address 15 (=3+4×3). A shift process according to the present embodiment is a process that entirely shifts the dot arrangement patterns such that the cell with an address computed on the basis of a shift value from among the addresses determined as above becomes the position (0, 0). More specifically, provided that the shift values K illustrated in FIG. 6 are expressed as K=i (where i is an integer from 0 to 15), the positions of the dot arrangement patterns are shifted such that the cell whose address is i% 16 moves to the position (0, 0), the cell whose address is (i+1) % 16 moves to the position (0, 1), the cell whose address is (i+2) % 16 moves to the position (0, 2), the cell whose address is (i+3) % 16 moves to the position (0, 3), the cell whose address is (i+4) % 16 moves to the position (1, 0), and so on, respectively. Note that the above term "(i+n) % 16" represents the remainder when dividing (i+n) by 16.

According to the above shift process, as illustrated in FIGS. 7A and 7B, the base matrix for the case of the shift value K=0 becomes the same matrix as the base matrix illustrated in FIG. 5A. Also, in the base matrix for the case of the shift value K=9, the dot arrangement patterns are shifted by 9 cells overall.

Figure 8:
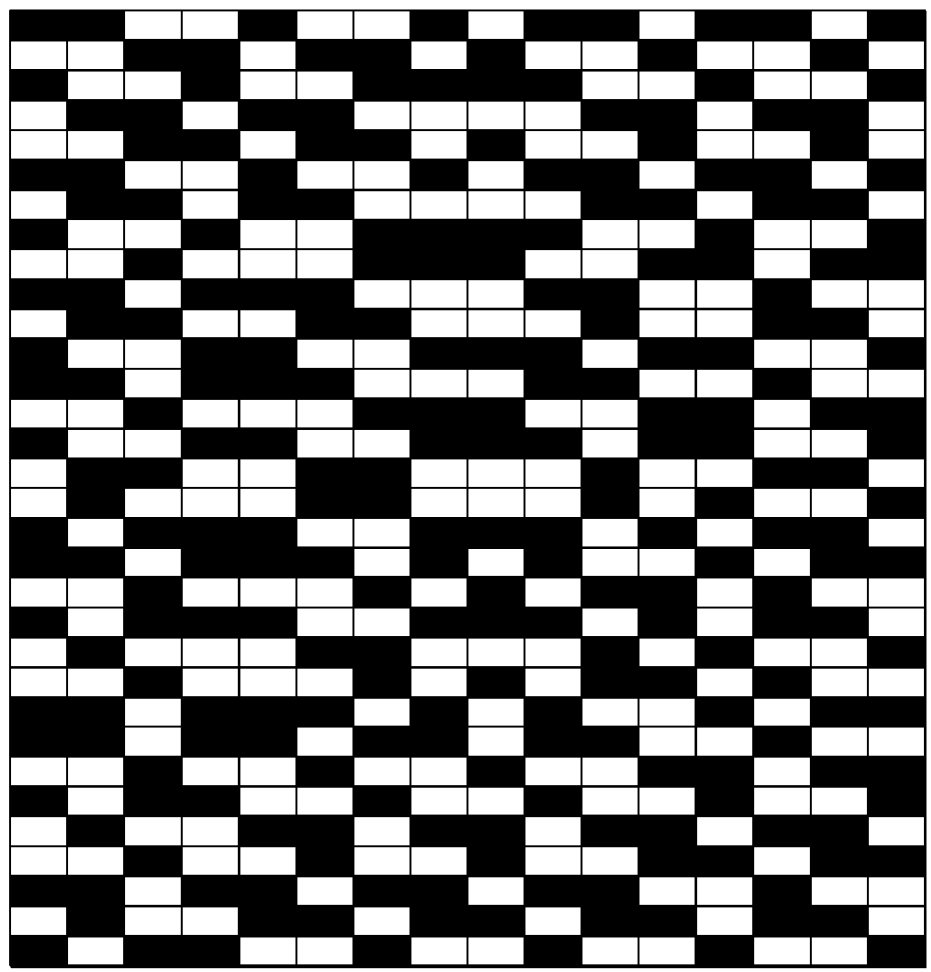
FIG. 8 is a diagram illustrating the result of using the base matrix made up of the gradation value Lv1 on pixel areas according to the shift process illustrated in FIGS. 6 to 7B.

FIG. 8 is a diagram illustrating the result of using the base matrix made up of the gradation value Lv1 on pixel areas according to the shift process illustrated in FIGS. 6 to 7B. Regular textures are reduced compared to the result of simply using the base matrix repeatedly without conducting a shift process as illustrated in FIG. 5B.

Figure 9A:
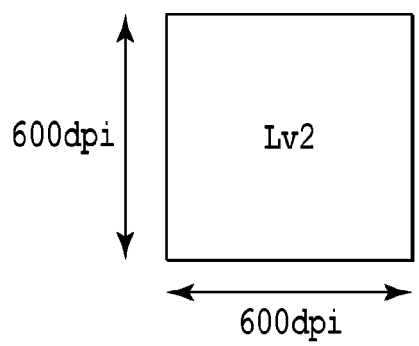
FIGS. 9A to 9C are diagrams illustrating dot arrangement patterns in the case where the gradation value is 2 (Lv2) according to the present embodiment.
Figure 9B:
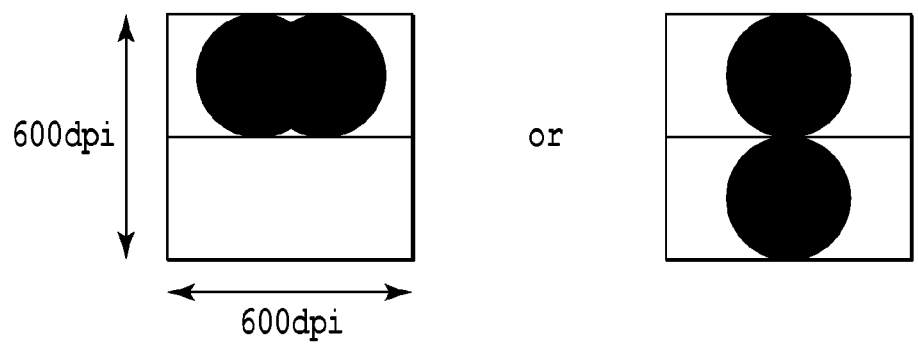
Figure 9C:
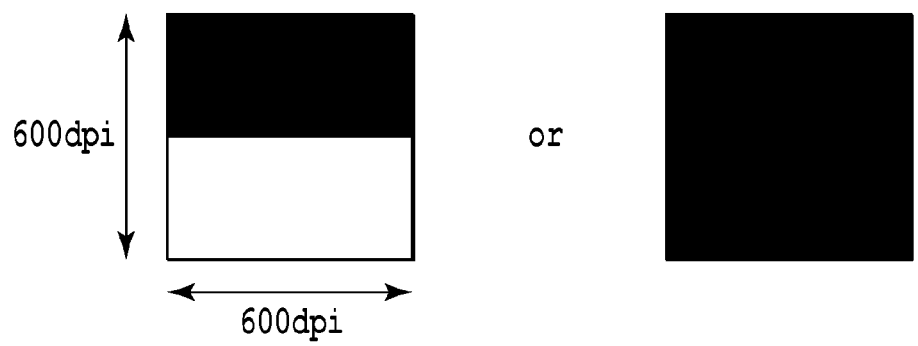

FIGS. 9A to 9C are diagrams illustrating dot arrangement patterns in the case where the gradation value is 2 (Lv2) according to the present embodiment. As illustrated in FIG. 9A, the quantization section 502 outputs gradation value data Lv2, which is 600 dpi quantized data. As illustrated in FIG. 9B, one pixel in this 600 dpi quantized data corresponds to a 1-pixel by 2-pixel unit having a resolution of 1200 dpi in the sub-scan direction. In addition, dot arrangement patterns are set in correspondence with these pixels. Two types of patterns are used for the dot arrangement patterns of the present embodiment: a pattern that disposes two dots on the upper pixel of the two pixels in the sub-scan direction, and a pattern that disposes one dot in each of the two respective pixels in the sub-scan direction. In other words, both dots are printed overlapping with the nozzle array a in FIG. 1, or one dot each is printed with the nozzle array a and the nozzle array b. FIG. 9C is a re-illustration of the two types of dot arrangements illustrated in FIG. 9B for easier comprehension.

Figure 10A:
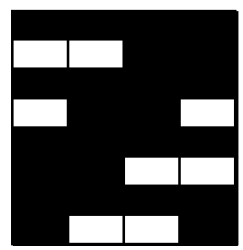
FIGS. 10A and 10B are diagrams illustrating a base matrix formed by laying out the dot arrangement patterns illustrated in FIG. 9C in 4×4 cells, and the state of using that base matrix as-is in the case where the quantized data is a Lv2 solid image.
Figure 10B:
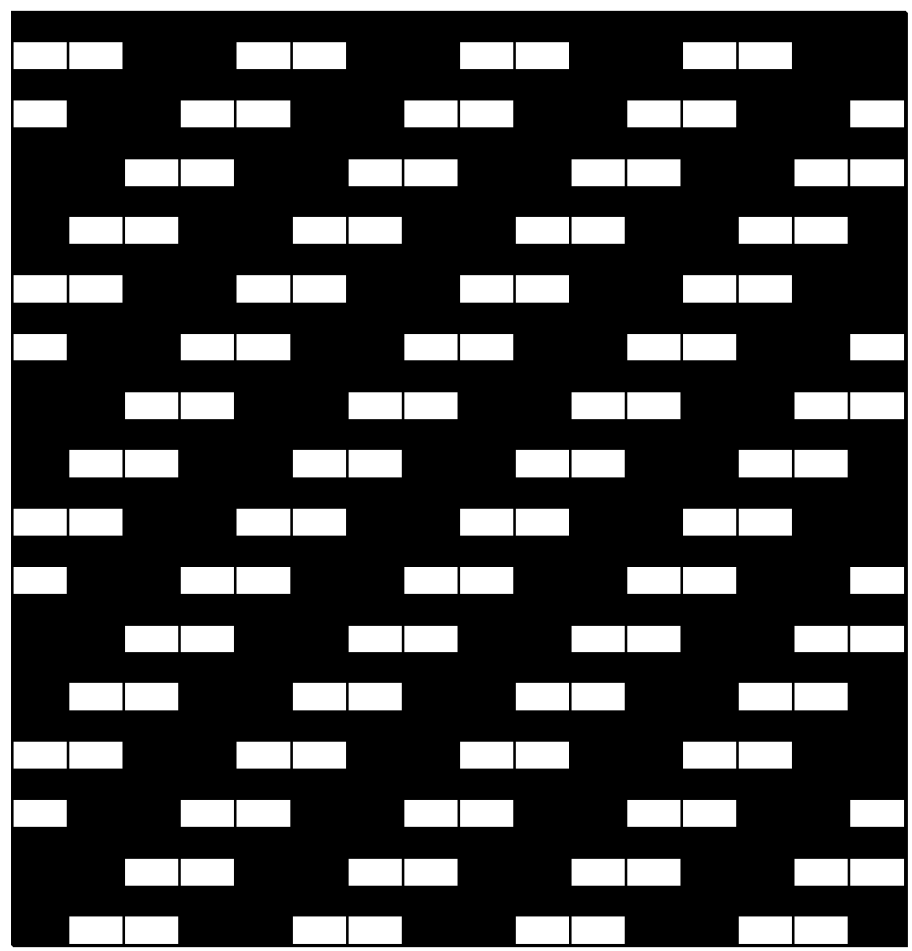

FIGS. 10A and 10B are diagrams similar to the Lv1 case in FIGS. 5A and 5B, and illustrate a base matrix formed by laying out the dot arrangement patterns illustrated in FIG. 9C in 4×4 cells, and the state of using that base matrix as-is in the case where the quantized data is a Lv2 solid image.

As illustrated in FIG. 10A, a base matrix is formed by using the two dot arrangement patterns illustrated in FIG. 9C in a given order. Additionally, as illustrated in FIG. 10B, in the case of repeatedly using the base matrix without a shift process, textures with the 4×4 matrix size (herein, diagonal lines occurring from the upper-right to the lower-left) are likewise produced in the case of Lv2 quantized data.

Figure 11:
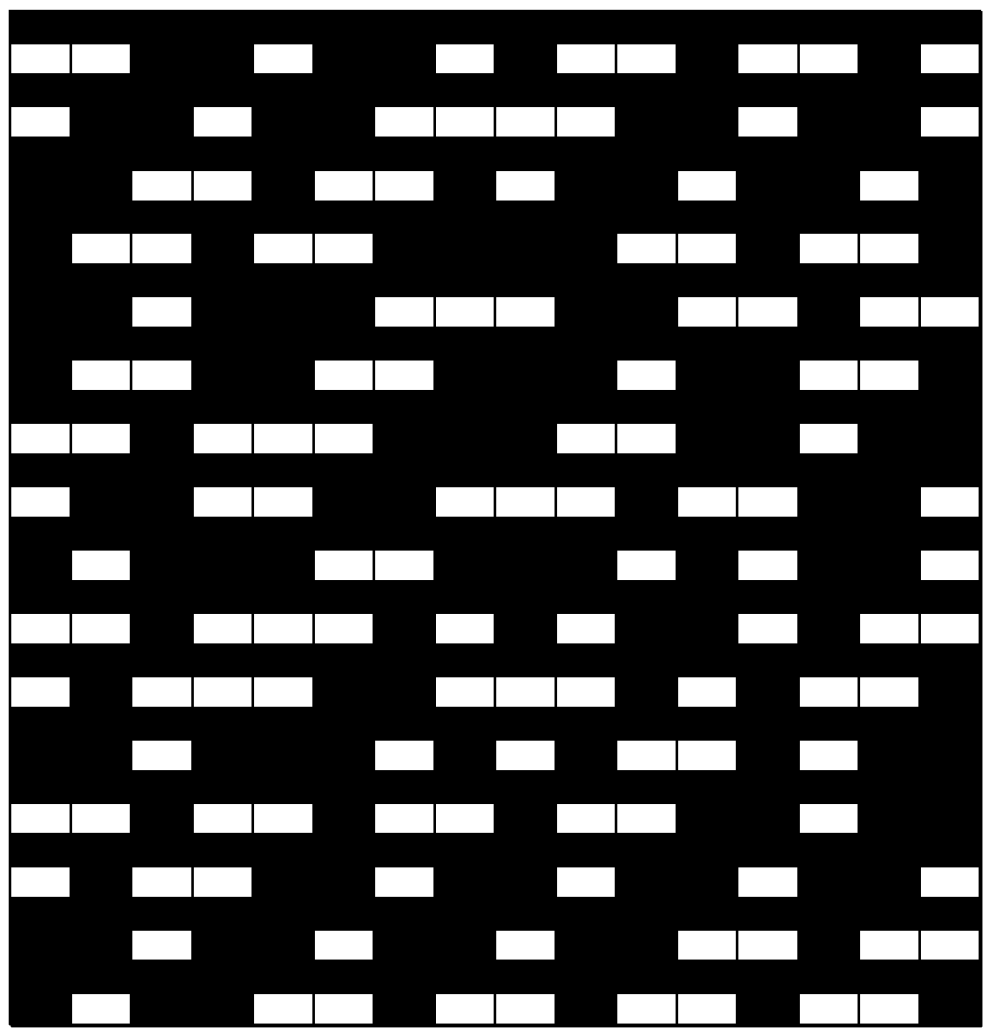
FIG. 11 is a diagram illustrating the result of using a base matrix by conducting the shift process illustrated in FIGS. 6 to 7B.

In contrast, the present embodiment conducts the shift process discussed earlier in FIGS. 6 to 7B on the gradation value Lv2. FIG. 11 is a diagram illustrating the result of using a base matrix by conducting the shift process. In the case where the gradation value is Lv2, it is likewise possible to reduce regular textures compared to the result of simply using the base matrix repeatedly without conducting a shift process as illustrated in FIG. 10B.

Note that, as discussed earlier, the base matrix differs depending on the image to be printed, and is not limited having dot arrangement patterns corresponding to one gradation value laid out in all of the 4×4 cells as illustrated in FIGS. 5A and 10A. However, even in such cases, it is obviously possible to execute a shift process when repeatedly using a base matrix in an embodiment of the present invention.

(Second Embodiment)

Figure 12:
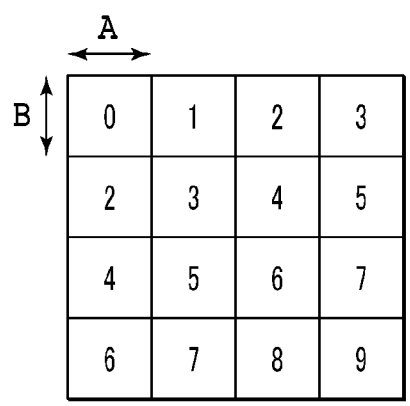
FIG. 12 is a diagram illustrating shift values generated by an shift value generating section 507 according to the second embodiment of the present invention.

The foregoing first embodiment relates to a configuration that generates shift values by using random numbers, but the present invention is not limited to this configuration. FIG. 12 is a diagram similar to FIG. 6 according to the first embodiment, and illustrates shift values generated by a shift value generating section 507 according to the second embodiment of the present invention. As illustrated in FIG. 12, the present embodiment generates regular shift values in the main scan direction and the sub-scan direction.

Figure 13:
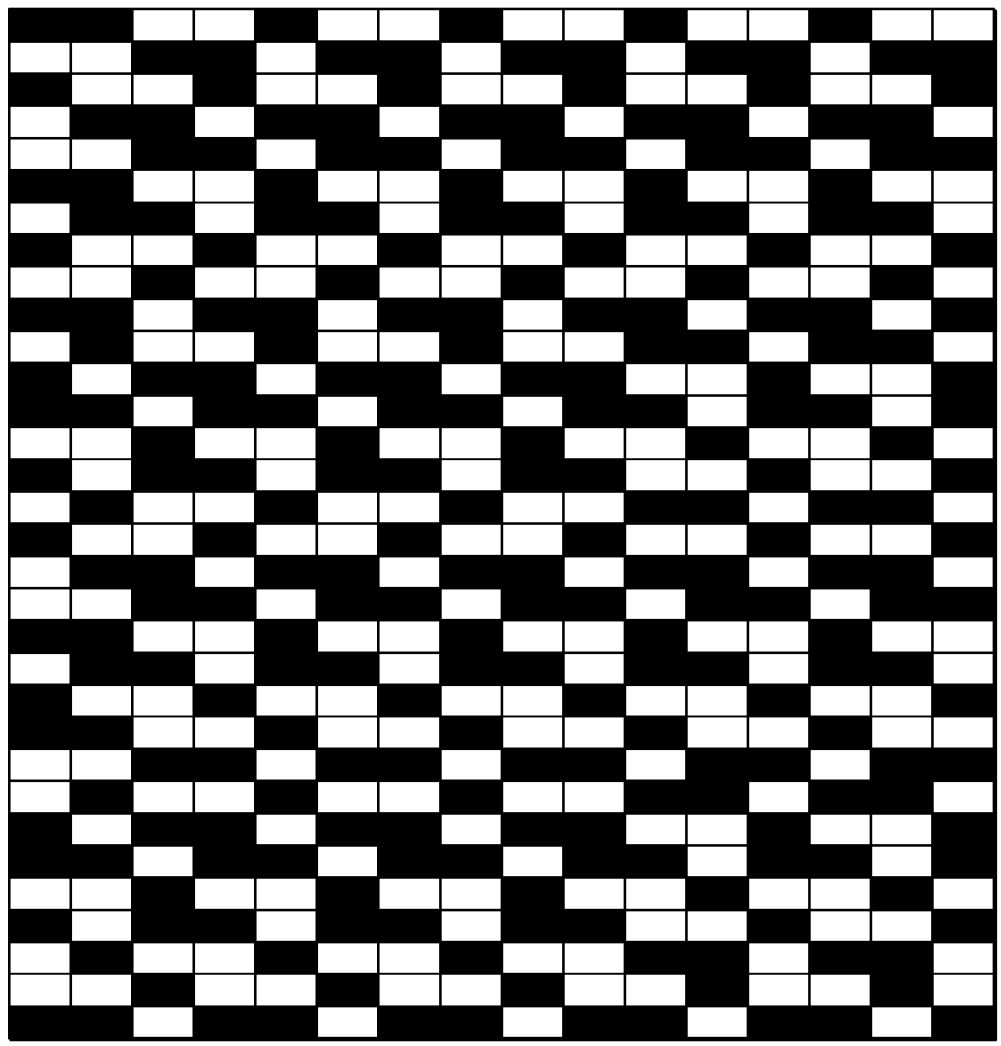
FIG. 13 is a diagram illustrating the results of developing dot arrangement patterns according to the shift process illustrated in FIGS. 7A and 7B, using the regular shift values illustrated in FIG. 12.

FIG. 13 is a diagram illustrating the results of developing dot arrangement patterns according to the shift process illustrated in FIGS. 7A and 7B, using the regular shift values illustrated in FIG. 12. As illustrated in FIG. 13, it is still possible to reduce regular textures even in the case of using regular shift values as in the present embodiment.

(Third Embodiment)

The first embodiment and the second embodiment relate to a process that one-dimensionally allocates a value (address) calculated on the basis of a shift value to each cell position (X, Y) in a base matrix, and shifts each dot arrangement pattern such that cell where the address is 1% 16 moves to the pixel position (0, 0). The shift process is obviously not limited to this configuration.

Figure 14:
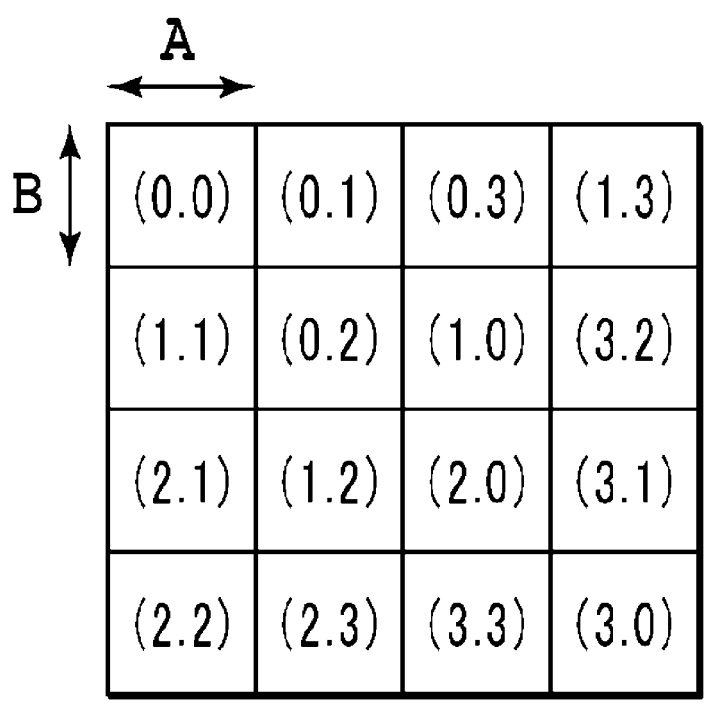
FIG. 14 is a diagram illustrating shift values (X, Y) generated by a shift value generating section 507 according to the third embodiment of the present invention.

FIG. 14 is a diagram illustrating shift values (X, Y) generated by a shift value generating section 507 according to the third embodiment of the present invention. As illustrated in FIG. 14, in the present embodiment, shift values are generated on the basis of two-dimensional cell positions (X, Y) in a base matrix. In other words, the shift value generating section 507 generates coordinates with random numbers in the ranges of 0≤X<A and 0≤Y<B (where X and Y are integers) for each set of coordinates X, Y expressing a cell position in the base matrix, and performs a shift process such that those coordinates become the position (0, 0).

Figure 15A:
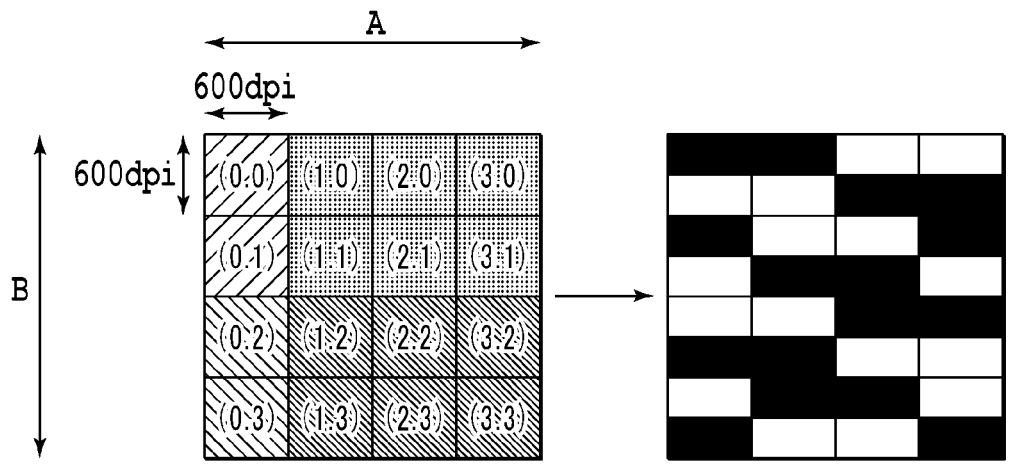
FIGS. 15A and 15B are diagrams illustrating a shift process for the case of a shift value (X, Y)=(0, 0) and a shift value (X, Y)=(1, 2) as examples from among the shift values (X, Y) illustrated in FIG. 14.
Figure 15B:
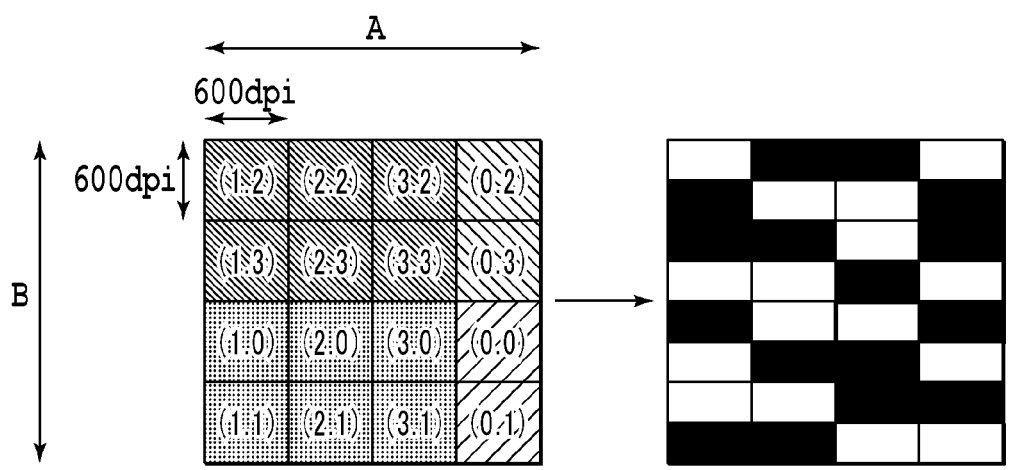

FIGS. 15A and 15B are diagrams illustrating a shift process for the case of shift values (X, Y)=(0, 0) and shift values (X, Y)=(1, 2) as examples from among the shift values (X, Y) illustrated in FIG. 14. The base matrix with the shift values (X, Y)=(0, 0) is the same matrix as the base matrix illustrated in FIG. 5A. Also, the case of the shift values (X, Y)=(1, 2) illustrates a base matrix in which the dot arrangement patterns are shifted overall such that the cell with the coordinates (X, Y)=(1, 2) in the base matrix moves to the cell position (0, 0).

Figure 16:
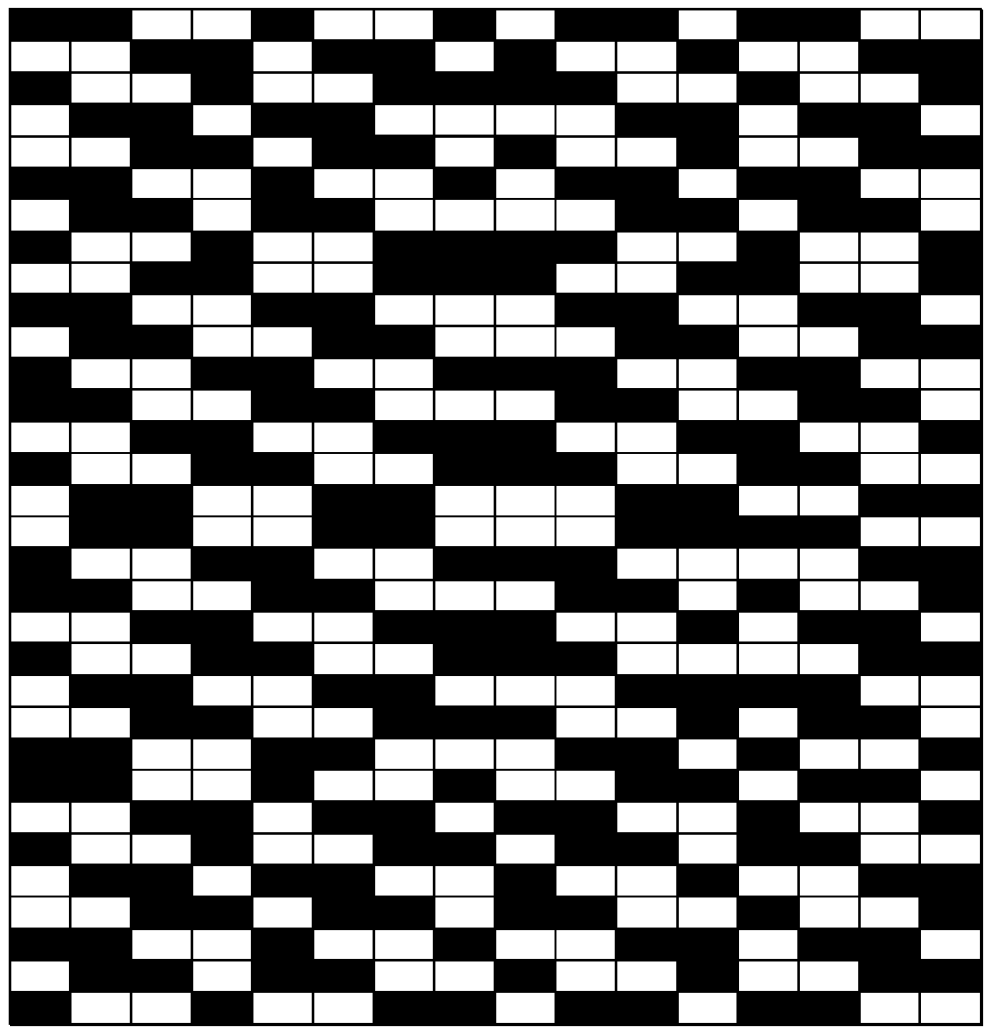
FIG. 16 is a diagram illustrating the results of developing dot arrangement patterns according to the shift process illustrated in FIGS. 15A and 15B, using the shift values illustrated in FIG. 14.

FIG. 16 is a diagram illustrating the results of developing dot arrangement patterns according to the shift process illustrated in FIGS. 15A and 15B, using the shift values illustrated in FIG. 14. As illustrated in FIG. 16, it is still possible to reduce regular textures even in the case of using random numbers to generate pixel positions in the base matrix as two-dimensional, (X, Y) shift values as in the present embodiment.

(Modifications)

Although the foregoing embodiments describe an example of the case where there are two types of dot arrangement patterns for one gradation value, application of the present invention is obviously not limited to such a configuration. For example, even in the case where there is one type, or three or more types, of dot arrangement patterns for one gradation value, the previously discussed textures which are the problem to be solved by the present invention may still occur, and in addition, it is still possible reduce such textures by conducting a shift process of the present invention.

In addition, the size of the base matrix is not limited to 4×4 as in the foregoing examples. The size may be determined to enable suitable texture reduction according to factors such as the printing apparatus specifications and the resolution of the image to print.

Furthermore, although the foregoing embodiments describe using a print head having a print resolution of 1200 dpi in the sub-scan direction, the present invention is not limited thereto. For example, even if using a print head having a print resolution of 600 dpi, for example, it is still possible to obtain similar advantageous effects by setting the resolution of print medium conveying amount to be 1200 dpi. Furthermore, the foregoing description clearly demonstrates that application of the present invention is not limited to this resolution.

(Fourth Embodiment)

Figure 17:
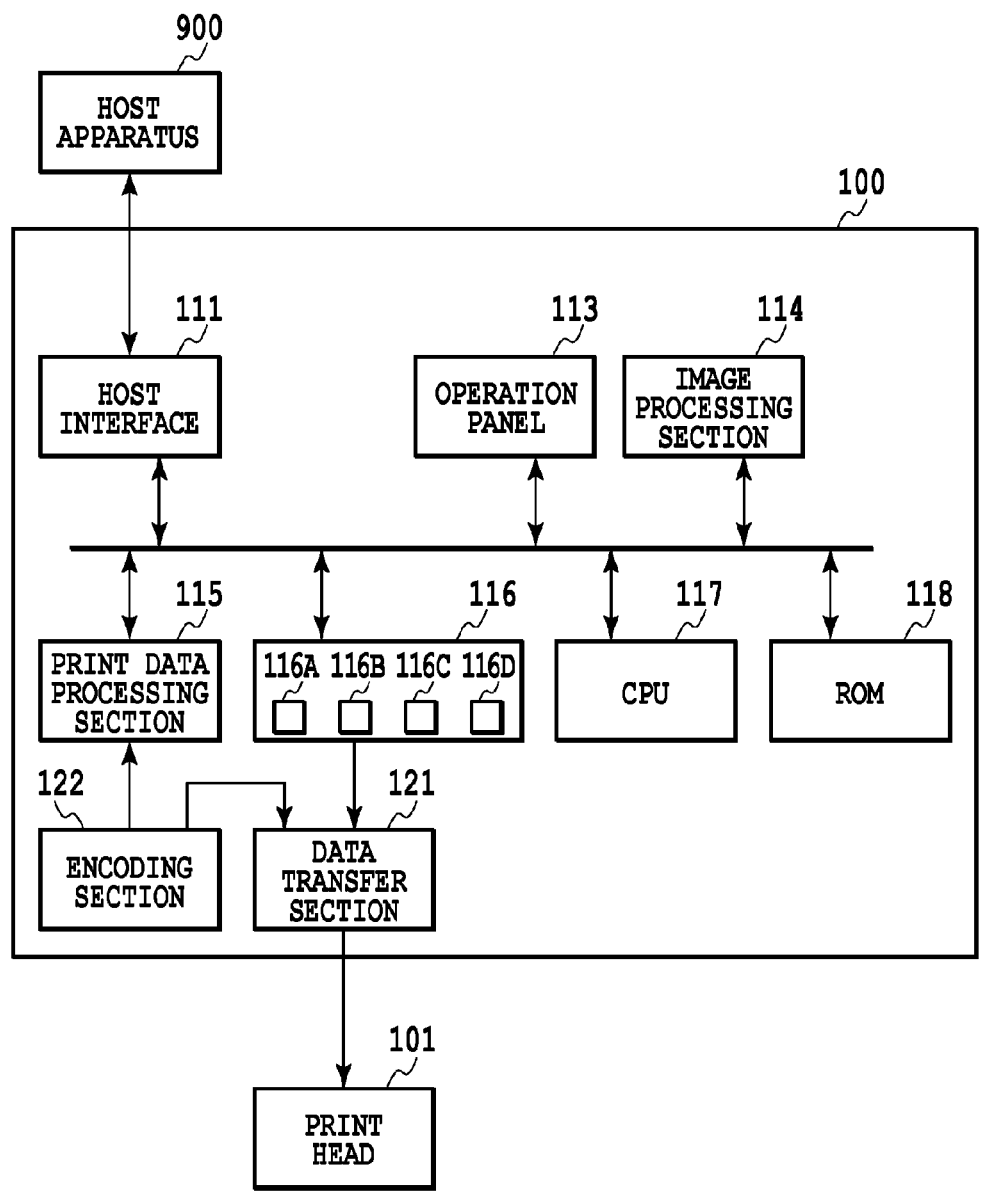
FIG. 17 is a block diagram illustrating a data processing and control configuration of an inkjet printing apparatus according to the fourth embodiment of the present invention.

FIG. 17 is a block diagram illustrating a data processing and control configuration of an inkjet printing apparatus according to the fourth embodiment of the present invention.

A printing system according to an embodiment of the present invention includes a host apparatus 900 such as a personal computer (PC), and a printing apparatus 100 that receives information such as image data and print control data from the host apparatus, processes the image data, and conducts printing on the basis thereof. The printing apparatus 100 is configured using the print head 101, on which a plurality of nozzles are arranged, to perform scanning of the print head for printing.

In FIG. 17, when the printing apparatus powers on, a CPU 117 executes a process that copies code table data discussed later with drawings such as FIG. 20 from ROM 118 to a code table buffer 116C (LSI embedded SRAM). Then, when printing starts, a host interface 111 inputs image data in JPEG format from the host apparatus 900. This image data is stored in a receive buffer 116A (DRAM) provided in RAM 116. An image processing section 114 converts the image data in JPEG format to multi-valued data with C, M, Y, and K color components, which is stored in a multi-valued data buffer 116B (DRAM) provided in the RAM 116. In the present embodiment, the image data from the host apparatus 900 is data having 8 bits and 256 values, which is converted by quantization into multi-valued data with 4 values.

As discussed later with drawings such as FIG. 20, a print data processing section 115 uses code table data stored in the code table buffer 116C to apply dot arrangement patterns to the above multi-valued data and generate dot data (binary data). More specifically, a print data generation process is conducted. The generated dot data is then stored in a dot data buffer 116D (LSI embedded SRAM). A data transfer section 121 transfers the binary data stored in the dot data buffer 116D to a print head 101. By synchronizing with a heat trigger signal output by an encoding section 122, the processing by the print data processing section 115 and the data transfer section 121 is able to correspond to the print medium conveying timings. The CPU 117, following a control program stored in the ROM 118, controls the processes for the above data processing and data transfer, while also conducting processing such as print head drive control and print medium conveying control.

Figure 18:
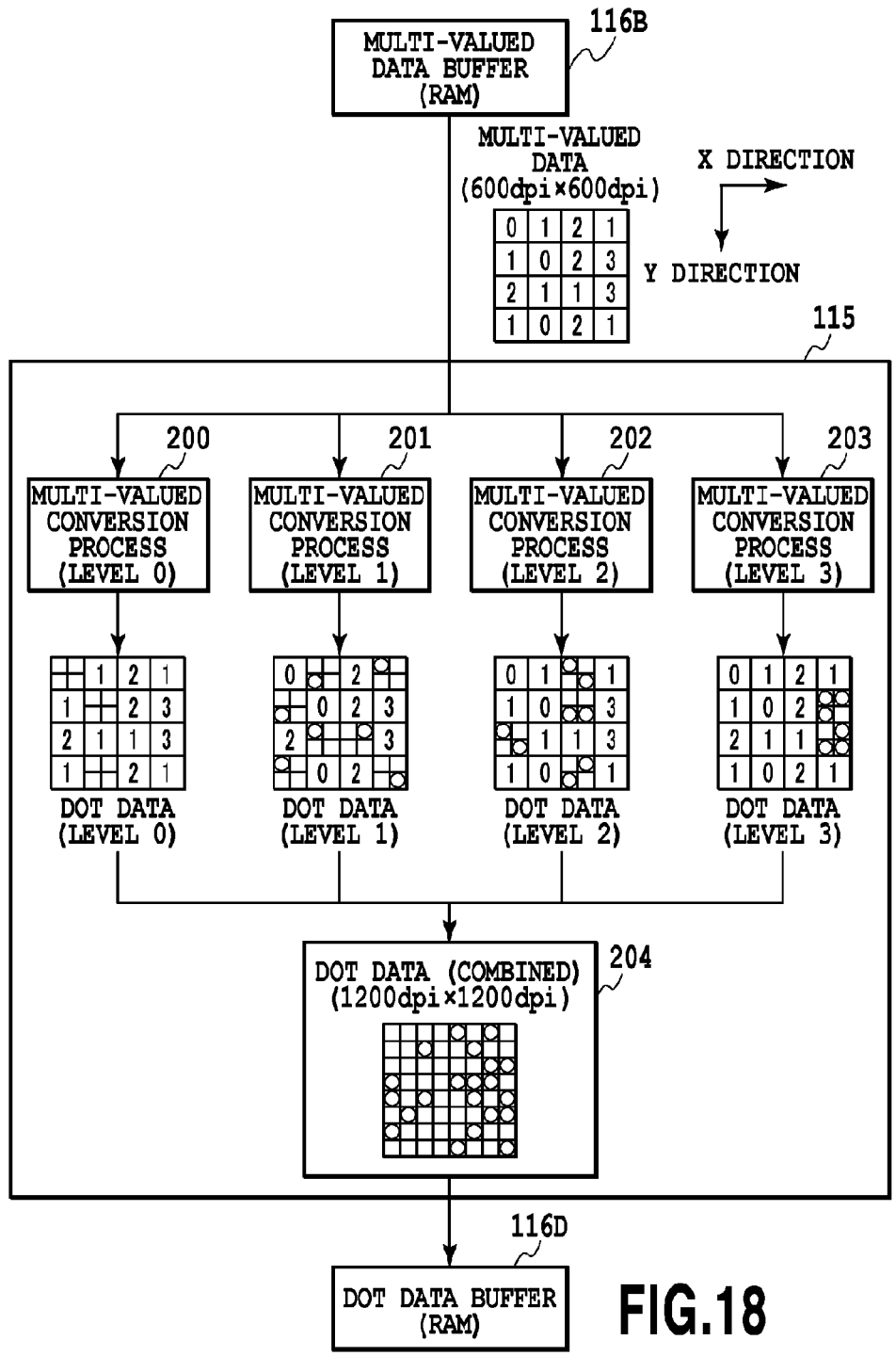
FIG. 18 is a block diagram summarizing processing by the print data processing section 115 illustrated in FIG. 17.

FIG. 18 is a block diagram summarizing processing by the print data processing section 115 described with FIG. 17.

In FIG. 18, the multi-valued image data is illustrated as 4-pixel by 4-pixel data for the sake of simplicity in the description and drawings, but the data obviously has a size covering the entirety of the print medium in use. The 4-pixel by 4-pixel given size is the same size as a code table of the present embodiment discussed later with drawings such as FIG. 20 (the code table corresponds to the base matrix (unit matrix) of the first through third embodiments illustrated in FIG. 7A), and multi-valued conversion processes 200 to 203 are conducted in units of this size. In other words, code table data of the present embodiment is repeatedly used in 4-pixel by 4-pixel units on a multi-valued image, thereby laying out dot data according to the dot arrangement patterns over the entirety of the print medium. However, in an embodiment of the present invention, by applying the code values of the code table (these correspond to the dot arrangement patterns in the base matrix of the first through third embodiments) in a shift state to pixels in the code table as discussed later, it becomes possible to generate binary data using a pseudo-sized code table equal to the print medium size. In addition, the multi-valued data handled by the present embodiment is 4-valued (4-level) data. In other words, as illustrated in FIG. 18, the multi-valued data is data having a value (level) of 0, 1, 2, or 3 for each pixel of 600 dpi by 600 dpi resolution.

The multi-valued data read from the multi-valued data buffer 116B is converted into dot data by multi-valued conversion processes 200 to 203 for each level. As described in detail with FIG. 20, with these multi-value conversion processes, a dot arrangement pattern having a dot arrangement corresponding to a code value indicated by the code table data is applied to each pixel in the multi-valued image data. In the present embodiment, a dot arrangement pattern is made as a unit of 2-pixel by 2-pixel at a resolution of 1200 dpi by 1200 dpi. Consequently, multi-valued data at a resolution of 600 dpi by 600 dpi is converted by the multi-value conversion processes into dot (binary) data at a resolution of 1200 dpi by 1200 dpi. The dot data for each level generated by the multi-valued conversion processes 200 to 203 are combined by a combining process 204 to generate final dot data, which is stored in the dot data buffer 116D.

Figure 19:
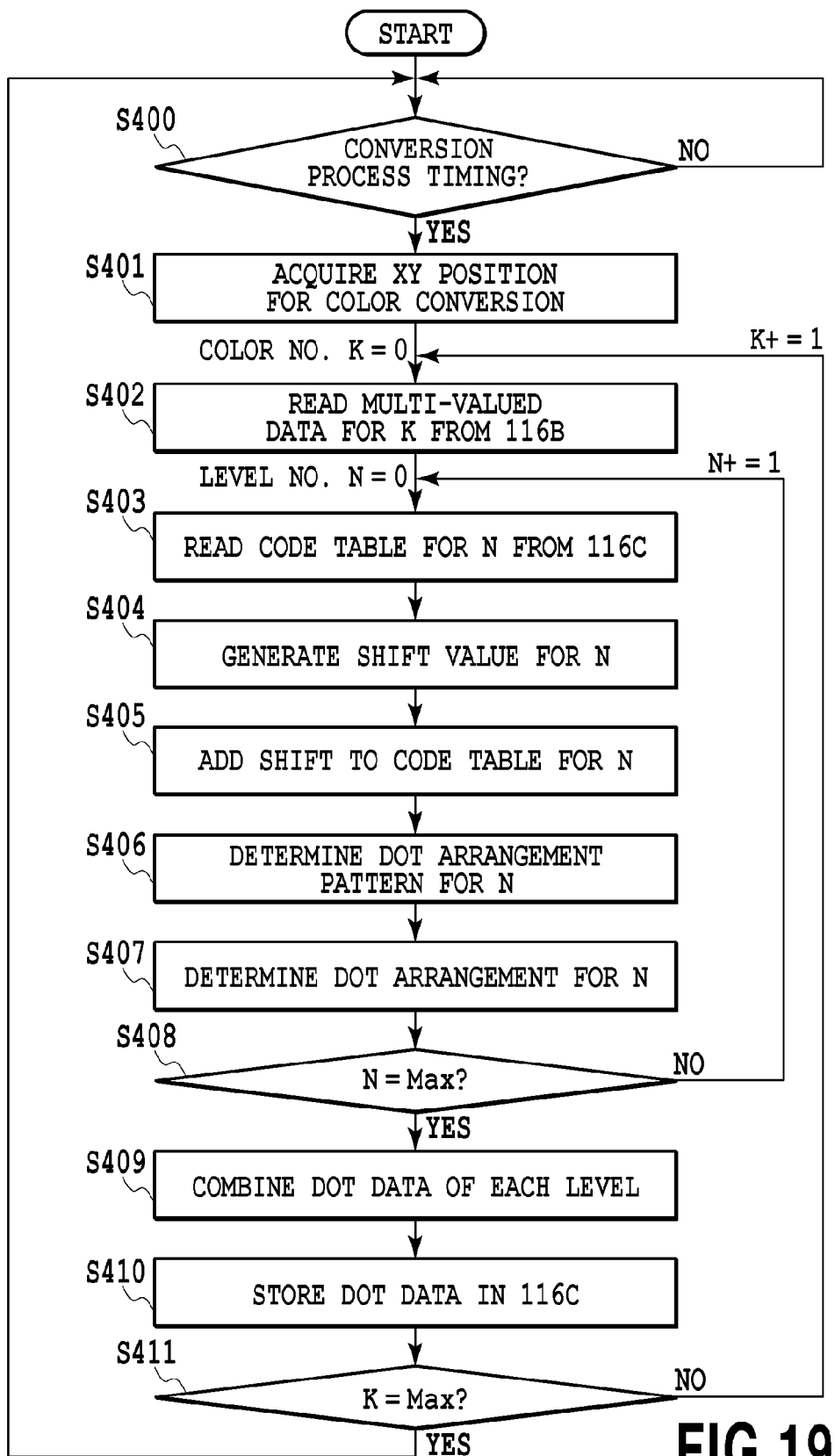
FIG. 19 is a flowchart detailing processing by the print data processing section 115 illustrated in FIG. 18.

FIG. 19 is a flowchart illustrating details of processing by the print data processing section 115 described above. This process is activated at the time of converting multi-valued data into binary data (S400). First, information (X, Y) regarding a position on the print medium for performing printing on the basis of multi-valued data according to the conversion processes is acquired (S401). This information is used in a process that generates shift values for the code table described in detail with reference to FIG. 21, to generate shift values on the basis of a position on the print medium where the code table is to be applied to perform printing on the basis of a 4-pixel by 4-pixel multi-valued data group. Then, the following process is conducted for each of the ink colors C, M, Y, and K (K=0 (C), 1 (M), 2 (Y), 3 (K)). First, in step S402, 4-pixel by 4-pixel multi-valued data corresponding to the position (X, Y) on the print medium is read out from the multi-valued data buffer 116B. Then, the following process is conducted for each level of the multi-valued data (N=0, 1, 2, 3). First, in step S403, a code table is read out from the code table buffer 116C in accordance with the combination of the multi-valued level to be processed and the ink color.

Next, in step S404, shift values are generated on the basis of the above position (X, Y) on the print medium, the multi-valued level, and the ink color, to be processed. Then, the generated shift values are used to add a shift to the code table (step S405), and a dot arrangement pattern for each pixel is determined in accordance with the code value for that pixel in the shift code table (step S406). Then, a 16-pixel by 16-pixel dot arrangement is determined in accordance with the respective dot arrangement patterns for the 4-pixel by 4-pixel group determined in this way (step S407). The processing in the above steps S404 to S407 is conducted for all levels (step S408).

Next, in step S409, the dot arrangements for each level are combined and the dot data for one ink color is obtained. Then, in step S410, the dot data is stored in the dot data buffer 116D.

The processing in the above steps S402 to S410 is conducted for all ink colors. In addition, the processing illustrated in FIG. 19 described above is conducted on the entire print medium on which an image is to be printed, while varying the position (X, Y) on the print medium.

Figure 20:
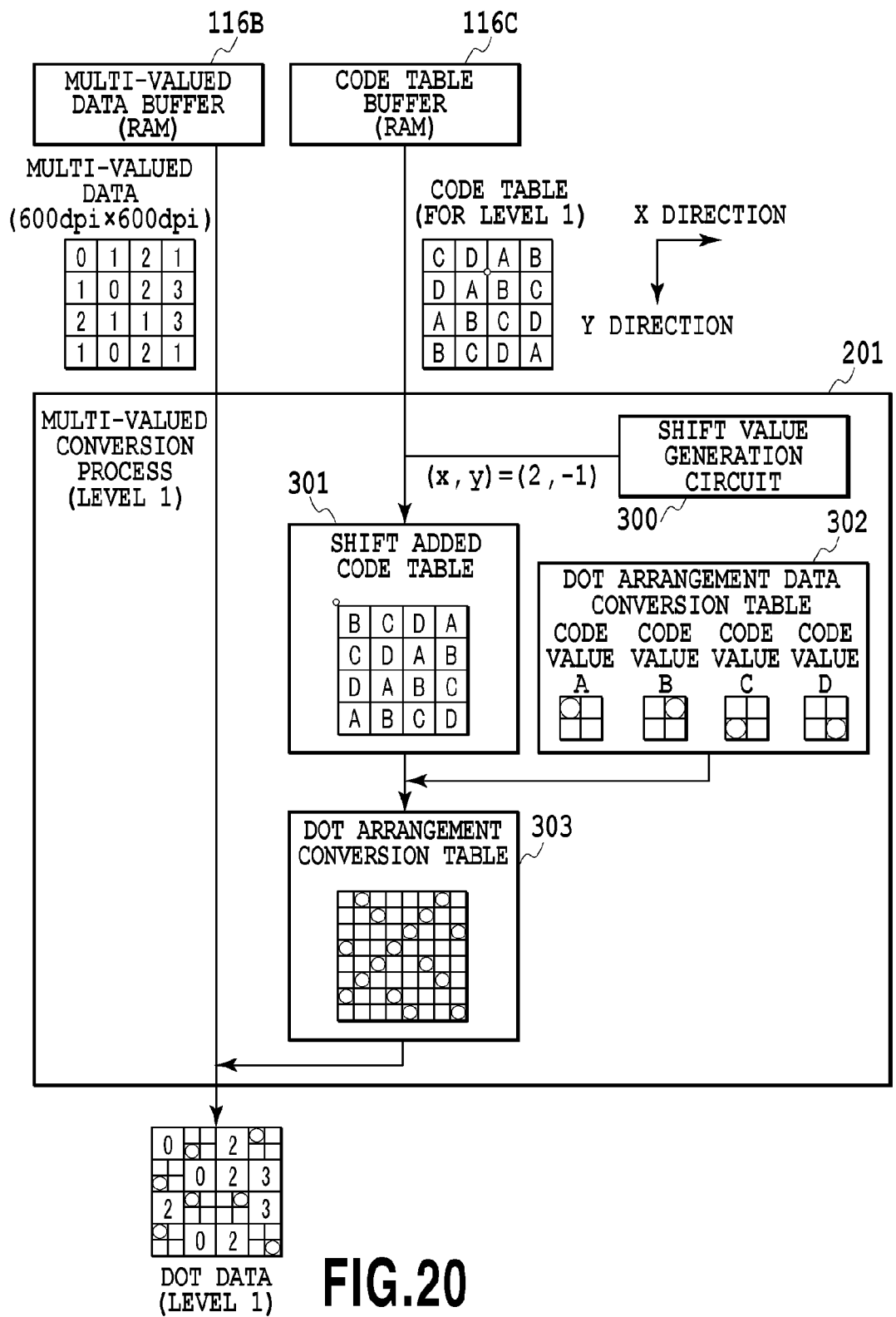
FIG. 20 is a diagram detailing the many-level conversion processing illustrated in FIGS. 18 and 19.

FIG. 20 is a diagram illustrating details of the multi-valued conversion processes described with FIG. 18 and FIG. 19. Specifically, FIG. 20 illustrates details of the multi-value conversion process 201 corresponding to level 1 of the multi-valued data. Note that the following description clearly demonstrates that the multi-value conversion processes on the multi-valued data for other levels are similar processes.

When converting multi-valued data read out from the multi-valued data buffer 116B, first, a code table is read out from the code table buffer 116C. In the present embodiment, different code tables are prepared for the 16 possible combinations of ink colors C, M, Y, K ejected from the print head and levels 0, 1, 2, 3 of the multi-valued data. In other words, the process illustrated in FIG. 20 represents a multi-value conversion process using a code table corresponding to the combination of level 1 of the multi-valued data and one ink color from among the ink colors C, M, Y, K in the multi-valued data. In the code table, a code value A, B, C, or D is determined for each pixel in a 4-pixel by 4-pixel arrays. The code values specify four dot arrangement patterns prepared for the same one level, as shown in the code value conversion table in FIG. 20. In the example illustrated in FIG. 20, the code value A specifies a dot arrangement pattern in which a dot (binary data of "1" indicating ejection) is disposed in the upper-left of a 2-pixel by 2-pixel array. The code values B, C, and D similarly specify respective dot arrangement patterns.

Note that although "pixels" are taken to be the units in which code values are set in the code table in this specification, the code table is obviously not image data. The term "pixel" is used above because, when applying the code table, the single units in which code values are set in the code table correspond to the single units of pixels in the multi-valued image data.

To the read-out code table, a shift is added at the shift values generated by a shift value generation circuit 300, and a shift added code table 301 is obtained. The shift value generation circuit 300 generates a shift value as discussed later in detail with FIG. 21. In the example illustrated in FIG. 20, the generated shift values are for two pixels in the X direction and one pixel in the Y direction ((X, Y)=(2, 1)). The shift process can be performed as a process in which respective pixel moves in the X direction and the Y direction. The move in the X direction is then conducted in units of columns each containing four vertical pixels in the 4-pixel by 4-pixel array. In the case of 2 pixels in the X direction, each column is respectively moved two pixels in the X direction (to the right in FIG. 20). With this move, columns that have no place to go in the 4-pixel by 4-pixel array move to the pixel array emptied by the above move. In other words, a rotation in the X direction is conducted for each of the above columns in the 4-pixel by 4-pixel array. The move in the Y direction is similar. In other words, the move is conducted in units of rows each containing four horizontal pixels in the 4-pixel by 4-pixel array. In the case of −1 pixel in the Y direction, each row is respectively rotated −1 pixel in the Y direction (downward in FIG. 20). That is, each row is moved in the direction opposite the Y direction by one pixel. As a result of the shift process in accordance with the shift values, the code table becomes the shift added code table 301 illustrated in FIG. 20.

Next, the dot arrangement data conversion table 302 is referenced by the code value of each pixel in the shift added code table 301, and a dot arrangement pattern is determined for each pixel. By determining a dot arrangement pattern for each pixel in the code table in this way, it is possible to create a dot arrangement conversion table 303 for the entire code table.

Then, level 1 pixels from among the multi-valued data for one ink color read out from the multi-valued data buffer 116B are respectively substituted with the dot arrangement pattern of a pixel in the dot arrangement conversion table 303 that corresponds to each pixel. Thus, it is possible to obtain dot data in which the level 1 multi-valued data has been converted into binary data.

Note that the shift process is obviously not limited to the above configuration. The way of shifting is not limited insofar as the process takes code values set for individual pixels in a code table, and shifts the code values in a given pixel array.

Figure 21:
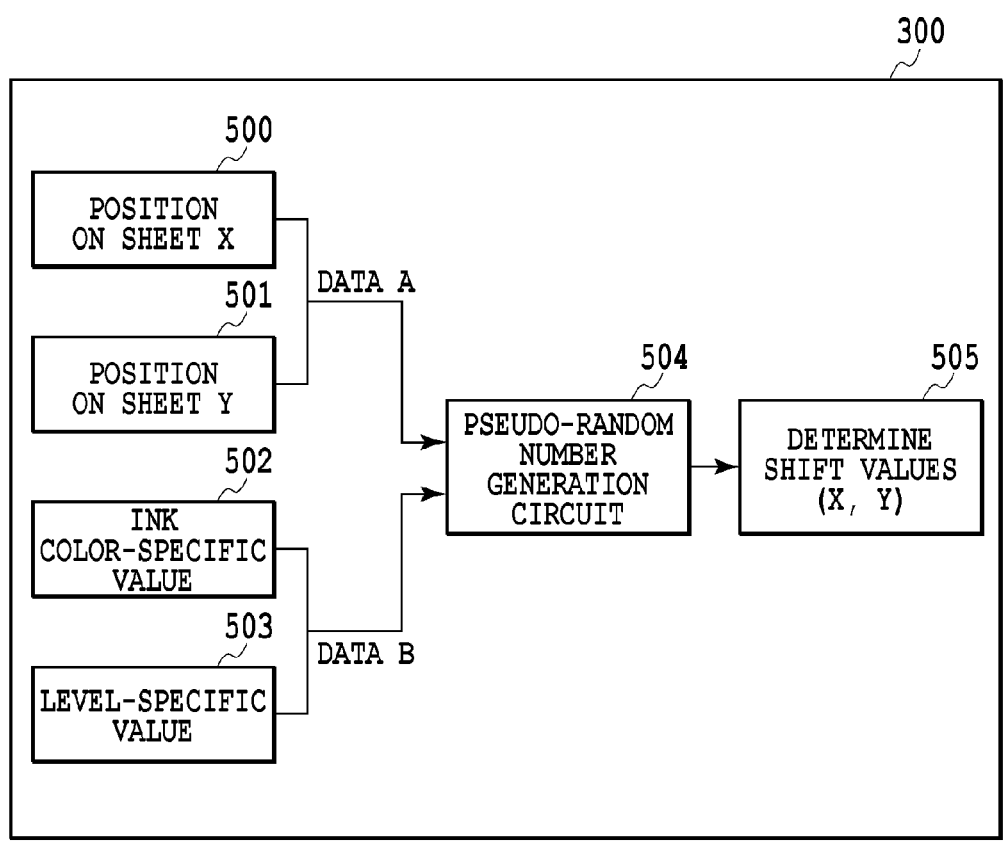
FIG. 21 is a block diagram detailing processing by the shift value generation circuit 300 illustrated in FIG. 20.

FIG. 21 is a block diagram detailing processing by the shift value generation circuit 300 illustrated in FIG. 20. Shift value generation in the present embodiment is conducted on the basis of a pseudo-random number. As illustrated in FIG. 21, a pseudo-random number of the present embodiment is produced by taking four pieces of information related to the multi-valued conversion process at that time as initial values or seeds. These four pieces of information are a position on sheet X, a position on sheet Y, an ink color-specific value, and a multi-valued data level-specific value.

A position on sheet X 500 and a position on sheet Y 501 are determined on the basis of the position (X, Y) of a pixel group related to the multi-value conversion process on the print medium, which was acquired in step S401 of the process illustrated in FIG. 19. The position on sheet X 500 and the position on sheet Y 501 are respectively 16-bit data, and combined to create 32-bit data A. Meanwhile, an ink color-specific value 502 for the multi-valued data related to the multi-value conversion process is taken to be 16-bit data, and in addition, a level-specific value 503 of the multi-valued data is taken to be 16-bit data. The data for these specific values are combined to create 32-bit data B.

A pseudo-random number generation circuit 504 generates a pseudo-random number by taking the data A and B as initial values or seeds. Specifically, a bitshift operation and an exclusive OR operation are performed on the 32-bit data A and the 32-bit data B 10 times in the present embodiment to yield 32-bit data. The least significant 2 bits of this 32-bit data are taken to be the shift value in the X direction, and the most significant 2 bits are taken to be the shift value in the Y direction.

As described above, according to the present embodiment, a fixed-size code table is repeatedly used to lay out binary print data associated with multi-valued image data onto a print medium. In addition, with every repetition, a pixel array in which code values of the code table are set is shifted, or in other words, modified, with the shift values being determined on the basis of the position of the multi-valued image data with respect to the print medium. Specifically, position information (X, Y) on the print medium is used as an initial value or seed in the generation of a pseudo-random number for generating shift values. Thus, the generated shift value is uniquely determined for the position information (X, Y) on the print medium. In other words, the shift values are linked to each other over the entire print medium, with each of 16 varieties of shift values (X=4 varieties×Y=4 varieties) being dispersed over the entire print medium. The result is equivalent to using a pseudo-sized code table equal to the print medium size, even though a fixed-size code table is being repeatedly used. Moreover, since the shift values are generated with a random number, the position of each shift value with respect to the entire print medium is non-periodic and well dispersed.

Also, since the data B is similarly used as an initial value or seed in the generation of a pseudo-random number, the shift values become uniquely determined for the ink color and the level of the multi-valued data. As a result, by setting different shift values for each ink color and level of the multi-valued data, for example, it becomes possible to print an image with desired image quality. Conversely, the specific value for each ink color may be set to the same value in the case where it is desirable to set the shift values for four colors of ink to the same value and control the combinations of ink ejected onto the print medium, for example. This similarly applies to the specific value for each level of the multi-valued data, and the specific value for each multi-valued level may be set to the same value in the case where it is desirable to obtain the same shift values among levels.

Note that although the pseudo-random number generation circuit is taken to have an input and output bit length of 32 bits in the present embodiment, obviously the configuration is not limited to this bit length. Since increasing the input and output bit length improves the non-periodicity given by the pseudo-random number, the bit length may be increased or decreased according to the size of the print medium. Although the computations for generating a pseudo-random number generation circuit are performed 10 times in the present embodiment, obviously the configuration is not limited to this number of iterations. The number of iterations may be set according to factors such as the size of the print medium to obtain a number yielding a desired non-periodicity.

Also, although the present embodiment is configured such that the shift values have a bit length of 2 bits each in the X direction and the Y direction, the configuration is not limited thereto. In other words, in the present embodiment, the shift values are taken to be 2 bits each since the size of the dot arrangement conversion table 303 is 4 pixels in the X direction and 4 pixels in the Y direction. However, these bit lengths may be determined according to the size of the dot arrangement conversion table.

Furthermore, the configuration for shift value generation is not limited to a pseudo-random number generation circuit. For example, a pseudo-random number may also be generating using the four arithmetic operations or the like. However, a circuit that creates shift values from past shift value is unsuitable, because in the hypothetical case where past shift values exert an influence, the dot arrangement patterns 204 stored in the code table buffer 116C will change and become irreproducible unless the order in which to read out multi-valued data from the multi-valued data buffer 116B is fixed. It is also undesirable to use true random number generation for the pseudo-random number generation, because reproducibility is lost if the value is not a value uniquely determined for the position on sheet.

Figure 22:
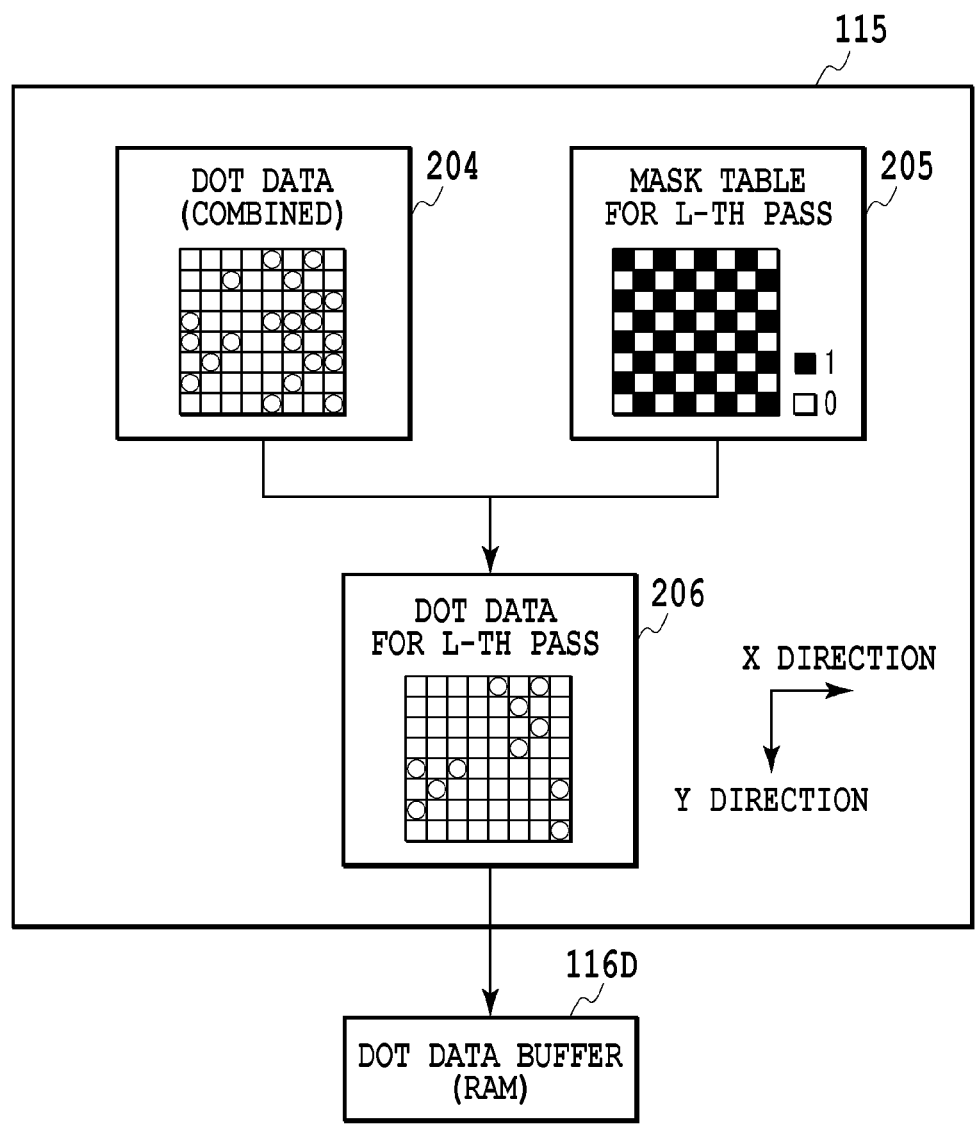
FIG. 22 is a diagram illustrating a print data processing section 115 for multi-pass printing.

FIG. 22 is a diagram illustrating a print data processing section 115 (FIG. 17) for multi-pass printing. It is possible to conduct multi-pass printing on the basis of dot data created using the code table described above. As illustrated in FIG. 22, a logical AND computation is performed on dot data 204 obtained by compositing the dot data for each level, and a mask table 205 for the Lth pass, yielding dot data 206 for the Lth pass. The dot data 206 for the Lth pass is then stored in the dot data buffer 116D. Cells labeled 1 are print permitting pixels, which are pixels where the printing of a dot is permitted. Cells labeled 0 are print no-permitting pixels, which are pixels where the printing of a dot is not permitted in that pass.

Note that although the processing conducted by the print data processing section including the multi-valued data recursive processor described in the foregoing is taken to be executed in an inkjet printing apparatus, the processing by the above print data processing section may also be executed on a host apparatus, for example. The printing apparatus, host apparatus, or other such apparatus that executes the processing of the above print data process constitutes a data processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2012-128892, filed Jun. 6, 2012 and 2012-153576, filed Jul. 9, 2012, which are hereby incorporated by reference herein in their entirety.

What is claimed is:

1. A data processing apparatus comprising:
an obtaining unit configured to obtain multi-valued data, a multi-value of which shows gradation of each of a plurality of pixels forming an image to be formed on a predetermined area of a print medium;
a dot arrangement determining unit configured to determine a dot arrangement of the plurality of pixels corresponding to the predetermined area for each of predetermined areas, according to a unit matrix that arranges dot arrangement patterns corresponding to the plurality of pixels, the dot arrangement patterns being used to determine the dot arrangement and being based on multi-valued data corresponding to each of the plurality of pixels in the multi-valued data obtained by the obtaining unit; and
a layout determining unit configured to determine a layout of the dot arrangement patterns in the unit matrix depending on a position of the predetermined area on the print medium, so that the layout of the dot arrangement patterns in the unit matrix used for a first predetermined area and the layout of the dot arrangement patterns in the unit matrix used for a second predetermined area, a position of which differs from a position of the first predetermined area on the print medium.

2. The data processing apparatus according to claim 1, wherein the layout of the dot arrangement patterns in the unit matrix used for the second predetermined area is a layout in which the layout of the dot arrangement patterns in the unit matrix used for the first predetermined area is shifted.

3. The data processing apparatus according to claim 1, wherein the layout determining unit determines a shift amount by which the layout of the dot arrangement patterns in the unit matrix is shifted, depending on each position of plurality of the predetermined areas on the print medium, and
the dot arrangement determining unit determines the dot arrangement for each of the plurality of predetermined areas by using the unit matrix for which the layout of the dot arrangement patterns is shifted by the determined shift amount.

4. The data processing apparatus according to claim 3, further comprising a shift value generating unit configured to generate a shift value for determining the shift amount.

5. The data processing apparatus according to claim 4, wherein the shift value generating unit has a pseudo-random number generation circuit to generate the shift value based on a pseudo-random number generated by the pseudo-random number generation circuit.

6. The data processing apparatus according to claim 4, wherein the shift value generating unit generates the shift value based on information showing a color of ink used for printing so that the shift value is made different corresponding to the color of ink.

7. The data processing apparatus according to claim 4, wherein the shift value generating unit generates the shift value so that the shift value is made different corresponding to the level of the multi-valued data.

8. The data processing apparatus according to claim 4, wherein the shift value generating unit generates the shift value so that the shift value according to the position on the print medium which corresponds to the unit matrix is a non-periodic value.

9. The data processing apparatus according to claim 4, wherein if (X, Y) is taken to be respective positions of the dot arrangement patterns in lateral and longitudinal directions in a pixel layout of the unit matrix, A is taken to be the number of pixels in the lateral direction, B is taken to be the number of pixels in the longitudinal direction, and the positions (X, Y) of the dot arrangement patterns are expressed by an address X+AY, the shift value generating unit determines the shift value so that a pixel having the address that is a remainder when the shift value by the A×B becomes to be positioned at the position (0, 0).

10. The data processing apparatus according to claim 4, wherein if (X, Y) is taken to be respective positions of the dot arrangement patterns in lateral and longitudinal directions in the unit matrix, the shift value generating unit determines the shift value so that a coordinate X, Y of the positions (X, Y), which is generated using random number, becomes to be the coordinate of the position (0, 0).

11. The data processing apparatus according to claim 4, wherein the shift value generating unit generates the shift value based on positional information of the predetermined area on the print medium so that the shift value is made different corresponding to the position of the predetermined area on the print medium to which the unit matrix corresponds.

12. The data processing apparatus according to claim 1, further comprising a storage unit configured to store the unit matrix, the unit matrix indicating an arrangement of a plurality of dot arrangement patterns in a lateral direction×a plurality of dot arrangement patterns in a longitudinal direction.

13. The data processing apparatus according to claim 1, wherein the layout of the dot arrangement patterns in the unit matrix used for the first predetermined area and the layout of the dot arrangement patterns in the unit matrix used for the second predetermined area lie adjacent to each other in a main scan direction.

14. The data processing apparatus according to claim 1, wherein the layout of the dot arrangement patterns in the unit matrix used for the first predetermined area and the layout of the dot arrangement patterns in the unit matrix used for the second predetermined area lie adjacent to each other in a sub-scan direction.

15. The data processing apparatus according to claim 1, further comprising a print head which ejects ink to the print medium based on the dot arrangement determined by the dot arrangement unit to print dots.

16. A data processing method executed by a data processing apparatus, comprising the steps of:
obtaining multi-valued data, a multi-value of which shows gradation of each of a plurality of pixels forming an image to be formed on a predetermined area of a print medium;
determining a dot arrangement of the plurality of pixels in the predetermined area for each of predetermined areas, according to a unit matrix that arranges dot arrangement patterns corresponding to the plurality of pixels, the dot arrangement patterns being used to determine the dot arrangement and being based on multi-valued data corresponding to each of the plurality of pixels which is obtained by the obtaining step; and
determining a layout of the dot arrangement patterns in the unit matrix depending on a position of the predetermined area on the print medium, so that a layout of the dot arrangement patterns in the unit matrix used for a first predetermined area and a layout of the dot arrangement patterns in the unit matrix used for a second predetermined area, a position of which differs from a position of the first predetermined area on the print medium, are different from each other.

17. The data processing method according to claim 16, wherein the layout of the dot arrangement patterns in the unit matrix used for the second predetermined area is a layout in which the layout of the dot arrangement patterns in the unit matrix used for the first predetermined area is shifted.

18. The data processing method according to claim 16, wherein the layout determining step determines a shift amount by which the layout of the dot arrangement patterns in the unit matrix is shifted, depending on each position of plurality of the predetermined areas on the print medium, and the dot arrangement determining step determines the dot arrangement for each of the plurality of predetermined areas by using the unit matrix for which the layout of the dot arrangement patterns is shifted by the determined shift amount.

19. The data processing method according to claim 18, wherein the method further comprises a shift value generating step of generating a shift value for determining the shift amount.

20. The data processing method according to claim 19, wherein the shift value generating step uses a pseudo-random number generation circuit to generate the shift value based on a pseudo-random number generated by the pseudo-random number generation circuit.

21. The data processing method according to claim 19, wherein the shift value generating step generates the shift value based on information showing a color of ink used for printing so that the shift value is made different corresponding to the color of ink.

22. The data processing method according to claim 19, wherein the shift value generating step generates the shift value so that the shift value is made different corresponding to the level of the multi-valued data.

23. The data processing method according to claim 19, wherein the shift value generating step generates the shift value so that the shift value according to the position on the print medium which corresponds to the unit matrix is a non-periodic value.

24. The data processing method according to claim 19, wherein if (X, Y) is taken to be respective positions of the dot arrangement patterns in lateral and longitudinal directions in a pixel layout of the unit matrix, A is taken to be the number of pixels in the lateral direction, B is taken to be the number of pixels in the longitudinal direction, and the positions (X, Y) of the dot arrangement patterns are expressed by an address X+AY, the shift value generating step determines the shift value so that a pixel having the address that is a remainder when the shift value by the A×B becomes to be positioned at the position (0, 0).

25. The data processing method according to claim 19, wherein if (X, Y) is taken to be respective positions of the dot arrangement patterns in lateral and longitudinal directions in the unit matrix, the shift value generating step determines the shift value so that a coordinate X, Y of the positions (X, Y), which is generated using random number, becomes to be the coordinate of the position (0, 0).

26. The data processing method according to claim 19, wherein the shift value generating step generates the shift value based on positional information of the predetermined area on the print medium so that the shift value is made different corresponding to the position of the predetermined area on the print medium to which the unit matrix corresponds.

27. The data processing method according to claim 16, wherein the layout of the dot arrangement patterns in the unit matrix used for the first predetermined area and the layout of the dot arrangement patterns in the unit matrix used for the second predetermined area lie adjacent to each other in a main scan direction.

28. The data processing method according to claim 16, wherein the layout of the dot arrangement patterns in the unit matrix used for the first predetermined area and the layout of the dot arrangement patterns in the unit matrix used for the second predetermined area lie adjacent to each other in a sub-scan direction.

* * * * *